United States Patent [19]
Kawakami et al.

[11] Patent Number: 5,641,591
[45] Date of Patent: Jun. 24, 1997

[54] RECHARGEABLE BATTERIES HAVING A SPECIFIC ANODE AND PROCESS FOR THE PRODUCTION OF THEM

[75] Inventors: Soichiro Kawakami; Shinya Mishina; Naoya Kobayashi, all of Nara; Masaya Asao, Kyoto, all of Japan

[73] Assignee: Canon Kabushiki Kaisha, Tokyo, Japan

[21] Appl. No.: 504,149

[22] Filed: Jul. 19, 1995

[30] Foreign Application Priority Data

Jul. 19, 1994 [JP] Japan .................... 6-166821

[51] Int. Cl.⁶ ............... H01M 4/58; H01M 4/42; H01M 10/00
[52] U.S. Cl. ............ 429/218; 429/209; 429/223; 429/229; 29/623.5
[58] Field of Search .................. 429/218, 229, 429/209, 223; 29/623.5

[56] References Cited

U.S. PATENT DOCUMENTS 5,401,599 3/1995 Tahara et al. ............... 429/218

FOREIGN PATENT DOCUMENTS

| | | | |
|---|---|---|---|
| 63-13264 | 1/1988 | Japan | H01M 4/40 |
| 63-114057 | 5/1988 | Japan | H01M 4/02 |
| 5-47381 | 2/1993 | Japan | H01M 4/40 |
| 5190171 | 7/1993 | Japan | H01M 4/02 |
| 5234585 | 9/1993 | Japan | H01M 4/02 |

OTHER PUBLICATIONS

Journal of Applied Electrochemistry, vol. 22, No. 7, Jul. 1992, N. Kumagai et al., "Cycling Behaviour of Lithium–Aluminium Alloys Formed on Various Aluminium Substrates as Negative Electrodes in Secondary Lithium Cells".

*Primary Examiner*—John S. Maples
*Attorney, Agent, or Firm*—Fitzpatrick, Cella, Harper & Scinto

[57] ABSTRACT

A rechargeable battery consisting of an anode, a cathode, a separator which is placed between the anode and the cathode and an electrolyte or electrolyte solution in contact with the anode and the cathode. The anode has an electrically conductive material which contains insulating or semiconductor film. The film covers protrusions present in the electrically conductive material. An opening between adjacent protrusions communicates with the electrical conductive material. Additionally, the electrically conductive material of the anode and the cathode contact the electrolyte through this opening. The rechargeable battery because of increased capacity and increased energy density has a prolonged charging and discharging life cycle. Moreover, the generation and growth of lithium or zinc dendrites are prevented.

24 Claims, 7 Drawing Sheets

RECHARGEABLE BATTERIES HAVING A SPECIFIC ANODE AND PROCESS FOR THE PRODUCTION OF THEM

BACKGROUND OF THE INVENTION

1. Field of the Invention

The present invention relates to an improvement in the rechargeable batteries in which chemical reaction with lithium is utilized (these rechargeable batteries will be hereinafter collectively referred to as rechargeable lithium battery) and also in the rechargeable zinc series batteries. More particularly, the present invention relates to an improvement in the rechargeable lithium batteries and rechargeable zinc series batteries so that they are always highly safe and stably exhibit an excellent current collecting performance while preventing occurrence or growth of a dendrite (or a branched tree-like protrusion) of lithium or zinc upon repetition of charging and discharging, and they are long enough in cycle life (in other words, they have a prolonged charging and discharging cycle life). The present invention includes a process for the production of an improved lithium battery and an improved zinc series battery.

2. Related Background Art

In recent years, heating of the earth because of the so-called greenhouse effect due to an increase of atmospheric $CO_2$ has been predicted.

In the case of the steam-power generation, the amount of a fossil fuel represented by coal or petroleum to be consumed for power generation in order to comply with a societal demand for increased power supply has been continuously increased and along with this, the amount of exhaust fumes from the steam-power generation plants has been continuously increased accordingly to raise the content of gases to cause a greenhouse effect such as carbon dioxide gas in the air. This results in providing an earth-warming phenomenon. In order to prevent said earth-warming phenomenon from further developing, there is a trend of prohibiting the establishment of a new steam-power generation plant in some countries.

Under this circumstance, a proposal has been made to conduct so-called load leveling in order to effectively utilize the power generator, wherein rechargeable batteries are installed at general houses and a surplus power unused in the night. That is, a so-called dump power, is stored in said rechargeable batteries and the power thus stored is supplied in the daytime when the power demand is increased, whereby the power generator is leveled in terms of the load therefor.

By the way, there is an increased societal demand for developing a lightweight rechargeable battery with a high energy density for an electric vehicle which does not exhaust any air polluting substance such as $CO_x$, $NO_x$, $SO_x$, hydrocarbon, and the like. In addition to this demand there is an increased societal demand for developing a miniature, lightweight, high performance rechargeable battery usable as a power source for potable instruments such as small personal computers, word processors, video cameras, and pocket telephones.

As such rechargeable battery, there has been proposed a rocking chair type lithium ion cell in which a lithium intercalation compound is used as a cathode active material and carbon is used as an anode active material. However, as of the present time, there has not been realized a practical usable lithium ion battery having a sufficiently high energy density, which is considered could be attained by using a metallic lithium as the anode active material.

The public attention has now focused on the rechargeable lithium battery in which metallic lithium is used as an anode, but as of the present time, there has not been a practical usable, high capacity rechargeable lithium battery with an improved energy density attained. Particularly, as for the known rechargeable lithium battery, there is a problem in that lithium is often deposited in a dendritic state (that is, in the form of a dendrite) on the negative electrode (or the anode) during the charging operation, wherein such deposition of lithium in a dendritic state results in causing internal shorts or self-discharge. In the worst case, such dendritic deposition breaks through a separator, which is usually disposed between the anode and the cathode, to reach the cathode, resulting in causing internal-shorts between the anode and the cathode.

As one of the reasons why such practically usable, high capacity rechargeable lithium battery as above described has not yet realized, there is a fact that a manner capable of preventing the occurrence of the above dendritic deposition has not developed.

Now, as above described, when the above lithium dendrite is once formed, the dendrite is liable to gradually grow upon the charging operation, resulting in causing internal-shorts between the anode and the cathode. When the anode is internally shorted with the cathode as above described, the energy possessed by the battery is shortly consumed at the internally shorted portion to entail problems such that the battery is heated or the solvent of the electrolyte is decomposed by virtue of heat to generate gas, resulting in raising the inner pressure of the battery. These problems result in damaging the rechargeable battery or/and shortening the lifetime of the battery.

There has been proposed a manner of using a lithium alloy such as lithium-aluminum alloy as the anode for a rechargeable lithium battery in order to suppress the reactivity of the lithium so that a lithium dendrite is hardly generated. This manner is effective in preventing the generation of the lithium dendrite but is not effective in attaining a rechargeable lithium battery having a high energy density and which is long enough in cycle life.

Particularly, Japanese Unexamined Patent Publication No. 13264/1988 (hereinafter referred to as document 1), No. 47381/1993 (hereinafter referred to as document 2) or No. 190171/1993 (hereinafter referred to as document 3) discloses a non-aqueous series rechargeable battery in which the anode is constituted by a lithium alloy. Particularly, of these documents, the document 3 discloses a non-aqueous series battery aiming at an improvement in the cycle life and also in the cycle characteristics after having been stored, in which the anode is constituted by a material comprising an aluminum-manganese alloy added with a metal which is more electrochemically noble than aluminum such as vanadium, chromium, or titanium, and lithium as the anode active material, wherein the active site of said alloy with said lithium is increased to prevent localization of the reaction.

Further, Japanese Unexamined Patent Publication No. 114057/1988 (hereinafter referred to as document 4) discloses a non-aqueous series rechargeable battery aiming at an improvement in the charging and discharging characteristics, in which the anode is constituted by a basic constituent comprising a sintered body of a mixture composed of fibrous aluminum and fibrous metal incapable of being alloyed with lithium and a negative material comprising a lithium-aluminum alloy.

In addition, Japanese Unexamined Patent Publication No. 234585/1993 (hereinafter referred to as document 5) discloses a non-aqueous series rechargeable battery aiming at minimizing the generation of a dendrite so that the charging efficiency is improved and the battery cycle life is prolonged, in which the anode is constituted by a member made of lithium metal, having powdery metal (which hardly forms an intermetallic compound with said lithium metal) uniformly deposited on the surface thereof.

However, any of the rechargeable batteries disclosed in the above documents 1 to 5 is still problematic in that as the charging and discharging are alternately repeated over a long period of time, the anode is repeatedly expanded and shrunk to often suffer from a removal of the constituents or from a crack, wherein the generation or growth of a dendrite cannot be sufficiently prevented and the rechargeable battery eventually becomes poor in current collecting performance.

Other than the above-mentioned documents, Journal of Applied Electrochemistry, 22, 620–627 (1992) (hereinafter referred to as document 6) discloses a rechargeable lithium battery in which the anode is constituted by an aluminum foil having a surface applied with etching treatment. However, the rechargeable lithium battery disclosed in the document 6 is problematic in that when the charging and discharging cycle is repeated as many as that practically conducted for the ordinary rechargeable battery, problems are liable to entail in that as the charging and discharging are alternately repeated, the aluminum foil is repeatedly expanded and shrunk to suffer from a crack, resulting in causing a reduction in the current collecting performance, wherein the growth of a dendrite is liable to occur.

Hence, any of the rechargeable batteries disclosed in the documents 1 to 6 is still accompanied by some problems required to be solved.

The above situation in the conventional rechargeable lithium batteries is similar in the conventional rechargeable nickel-zinc batteries, rechargeable zinc-oxygen (or zinc-air) batteries and rechargeable bromine-zinc batteries. That is, in any of these zinc series batteries, the foregoing problems relating to the occurrence of a dendrite in the rechargeable lithium batteries are liable to often occur and therefore, it is difficult to attain a high energy density and a prolonged cycle life.

Accordingly, there is an increased demand for provision of an improved, highly reliable rechargeable battery which is high in energy density (or charge energy density) and long enough in charging and discharging cycle life.

SUMMARY OF THE INVENTION

A principal object of the present invention is to eliminate the foregoing problems found in the known rechargeable batteries and to provide an improved rechargeable which is free of such problems.

Another object of the present invention is to provide a highly reliable rechargeable battery which is high in energy density and long enough in cycle life (that is, charging and discharging cycle).

A further object of the present invention is to provide a rechargeable battery having an improved anode structured which is free of growth of a dendrite even when the charging and discharging are alternately repeated over a long period of time, and it makes the rechargeable battery to stably exhibit an excellent current collecting performance without being deteriorated.

A further object of the present invention is to provide a highly reliable rechargeable battery having a simple structure which can be easily handled and which can be efficiently produced by the conventional technique.

A further object of the present invention is to provide a highly reliable rechargeable battery which can be mass-produced without a variation in terms of the battery performance at a reduced production cost.

A further object of the present invention is to provide a process for the production of the above rechargeable battery.

A further object of the present invention is to provide a highly reliable rechargeable battery comprising an anode (or a negative electrode), a separator, a cathode (or a positive electrode), an electrolyte or an electrolyte solution, and a housing, characterized in that said anode comprises an electrically conductive material and an insulating material or a semiconductor material which is disposed so that said insulating material or said semiconductor material covers protrusions present at said electrically conductive material.

A further object of the present invention is to provide a process for the production of a highly reliable rechargeable battery comprising an anode, a separator, a cathode, an electrolyte or an electrolyte solution, and a housing, characterized by including a step of forming a film of an insulating material or a semiconductor material on an electrically conductive material constituting said anode by means of an electrochemical process comprising one or more manners selected from the group consisting of anodic oxidation, anodic deposition, cathodic deposition, electropolymerization, and electrophoretic electrodeposition in an electrolyte solution, so that said film covers protrusions present at said electrically conductive material of said anode.

The term "rechargeable battery" in the present invention includes a rechargeable lithium battery, a rechargeable nickel-zinc battery, a rechargeable zinc-oxygen battery, and a rechargeable bromine-zinc battery. (In the following, these batteries will be occasionally collectively referred to as rechargeable zinc series battery.)

DESCRIPTION OF THE INVENTION AND PREFERRED EMBODIMENTS

The present invention is to eliminate the foregoing problems found in the prior art and to attain the above described objects.

The present invention has been accomplished based on findings obtained through experimental studies by the present inventors in order to attain the above objects.

Description will be made of the experimental studies conducted by the present inventors.

Figure 1A:
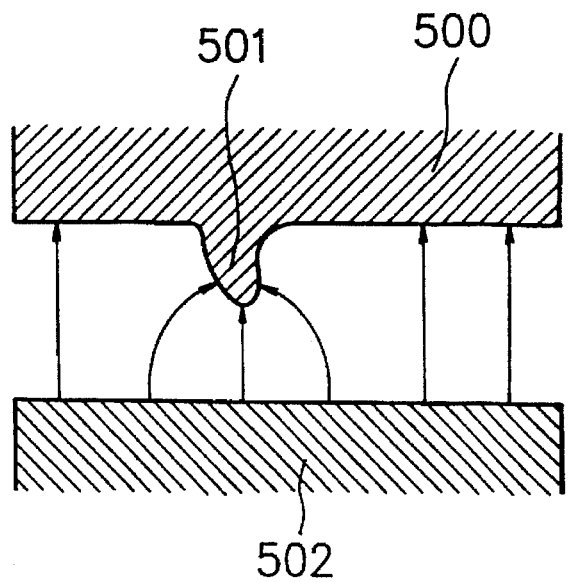
FIGS. 1(a) and 1(b) are schematic explanatory views each for illustrating an example of a state for lines of electric force generated upon operating charging in a rechargeable battery.
Figure 1B:
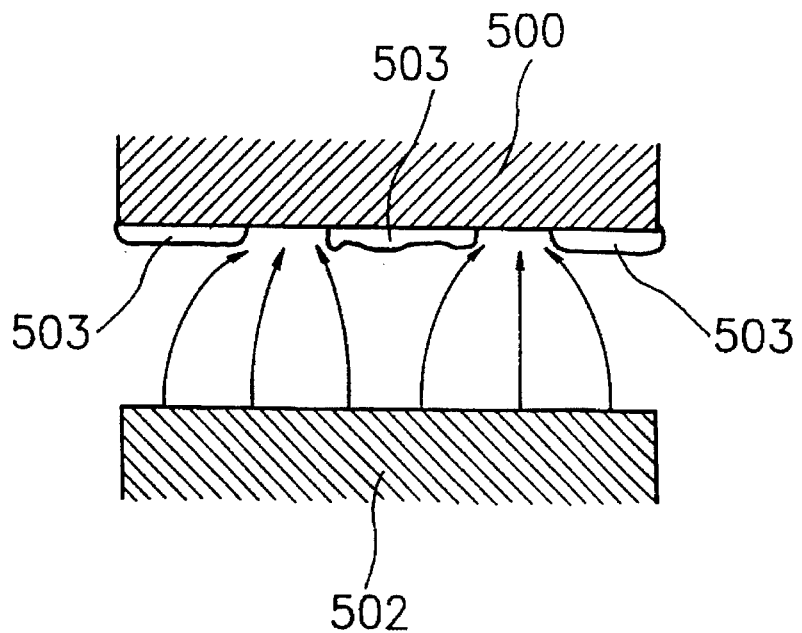

Incidentally, FIGS. 1(a) and 1(b) are schematic explanatory views each for illustrating a presumed state for lines of electric force generated upon operating charging in a rechargeable battery. Particularly, in FIG. 1(a), an electrically conductive anode 500 was intentionally shaped to have a protrusion 501 projected toward a counter cathode 502. In FIG. 1(b), an electrically conductive anode 500 was intentionally configured to have a plurality of insulating film islands 503 to spacedly cover a surface of the anode which is opposed to a cathode 502. In any of these figures, it is a matter of course that an electrolyte or an electrolyte solution (in the following, the electrolyte and electrolyte solution will be occasionally collectively referred to as electrolyte) and a separator are disposed between the anode and the cathode (not shown).

Based on a presumption that the anode in such configuration shown in FIG. 1(a) or FIG. 1(b) would have a portion at which lines of electric force are centralized, the present inventors conducted extensive studies though experiments of the anode.

In any of FIGS. 1(a) and 1(b), lines with arrow marks indicate lines of electric force. In the case of FIG. 1(a), it was presumed that lines of electric force would be centralized at the protrusion 501 of the anode 500. In the case of FIG. 1(b), it was presumed that lines of electric force would be centralized at each portion of the anode which is not covered by the insulating film 503.

Now, in the experiment studies, the anode 500 was formed of a nickel or titanium foil so as to have such protrusion 501 as shown in FIG. 1(a). Separately, as shown in FIG. 1(b), the anode 500 was formed of a nickel or titanium foil and an insulating film 503 was formed so as to spacedly cover the surface of the anode. As for each of these, deposition of lithium was purposely caused at the electrically conductive anode 500 at a high current density by way of the charging reaction. As a result, in each case, there was observed the deposition of a lithium dendrite at a portion of the anode which was previously presumed to be from the centralization of lines of electric force. The results obtained revealed that the presence of a protrusion or an uneven coating insulating film on the surface of the anode will be a cause of growing a lithium dendrite.

Incidentally, in the case where the anode is comprised of a lithium metal foil, when the anode and the cathode are pressed to shorten the distance between the anode and the cathode in order to attain a reduction in the impedance of a rechargeable battery, there is a probability that if the cathode should have irregularities thereon, said irregularities are transferred to the surface of the anode during the pressure treatment to provide protrusions at the surface of the anode because the lithium metal foil is soft. In addition, there is a probability that the lithium metal foil as the anode is reacted with a foreign matter present in an handling atmosphere or in an electrolyte to cause the formation of an uneven insulating film of lithium carbonate, lithium hydroxide, or lithium fluoride on the surface of the anode.

Therefore, it is highly probable that the foregoing phenomena described with respect to FIGS. 1(a) and FIG. 1(b) would occur in practice.

In order to prevent the growth of a lithium dendrite due to such causes as above described, it is considered that to eliminate or minimize the formation of the foregoing protrusion or uneven insulating coating film is effective. In order to attain this situation, there is considered a method that the surface of the anode is mirror-polished in an extremely smooth state wherein even a microprotrusion is not present, and after the polishing treatment, a sufficient care is made so that the polished surface is not damaged. There is considered another manner that such insulating film comprising lithium carbonate, lithium hydroxide, or lithium fluoride of covering the surface of the anode comprised of a lithium metal foil or other insulating film comprising metal oxide of covering the surface of the anode is completely or substantially removed.

However, these manners are not practically employable for the following reasons. That is, it is extremely difficult to mirror-polish the surface of a soft metal member comprised of lithium or the like as a basic constituent of the anode in such a sate as above described. In order to eliminate the formation of the foregoing insulating films on the surface of the anode, it is necessary that in the preparation of an anode, the surface thereof is well cleaned in an atmosphere composed of inert gas unreactive with the constituent of the anode or under vacuum condition having a due care so that the surface of the anode is prevented from being reacted with an environmental atmosphere or an environmental material to form a reaction product (that is, an insulating film) on said surface, and the remaining steps for the fabrication of a rechargeable battery are conducted in an atmosphere composed of appropriate inert gas or under vacuum condition. It is also necessary to use an electrolyte which does not contain a foreign matter liable of reacting with the anode to form an insulating film on the surface of the anode. In practice, these are difficult to be satisfactorily achieved as desired. If the foregoing surface mirror-polishing treatment or cleaning treatment should be conducted as desired, problems entail in that the production cost of a rechargeable battery is unavoidably raised and in addition, the resulting rechargeable batteries are liable to vary in terms of the battery performance. In addition, there is a factor that in a rechargeable lithium battery or a recharge zinc series battery, the surface of a lithium or zinc member used as the electrode thereof is liable to change also during its contact with an electrolyte with the passage of time, wherein it is difficult to maintain said surface in a desirable state.

In view of these backgrounds, the present inventors conducted extensive studies in order to find out a simple manner which enables to effectively prevent the growth of a dendrite of lithium or zinc at the anode. As a result, there was obtained a finding that when the anode is designed to have a structure comprising an electrically conductive material and an insulating film or a semiconductor film disposed such that protrusions at the electrically conductive material are covered by the insulating or semiconductor film while exposing a portion of the electrically conductive material between each adjacent protrusions, the growth of a dendrite of lithium or zinc generated upon operating charging is effectively prevented as desired.

The present invention has been accomplished based on this finding.

A principal feature of the present invention lies in a specific anode used in a rechargeable battery, said anode comprising an electrically conductive material and an insulating film or a semiconductor film disposed such that protrusions at the outermost side of the electrically conductive material are covered by the insulating or semiconductor film while exposing a portion of the electrically conductive material between each adjacent protrusions. Particularly, the present invention provides an improved rechargeable battery provided with said specific anode. In the rechargeable battery according to the present invention, the foregoing problems of causing the growth of a dendrite due to the centralization of lines of electric force at a protrusion or uneven surface state of the anode when the charging and discharging cycle is repeated are effectively eliminated. That is, in the rechargeable battery according to the present invention, since the anode is specifically structured as above described, the centralization of lines of electric force hardly occurs at the outermost surface of the anode even when the charging and discharging cycle is repeated over a long period of time. The generation of a dendrite of lithium or zinc at the anode is effectively prevented or if said dendrite should be generated, its growth is effectively prevented.

The present invention includes a process of forming an anode used in a rechargeable battery by forming said insulating or semiconductor film on said electrically conductive material such that protrusions present at the electrically conductive material are covered by the insulating or semiconductor film while exposing a portion of the electrically conductive material between each adjacent protrusions.

The term "protrusion" in the present invention is meant to include a pointed portion, an angled portion and an island present at the surface of the electrode but also those present at the side ends thereof, which will be a portion with a locally great field strength on the electrically conductive surface of the electrode when the charging and discharging cycle is repeated.

When the insulating or semiconductor film is disposed to cover such protrusion of the anode constituting conductive material, the insulating or semiconductor film provides a projection depending on the protrusion. As for the size of this projection, a due care should be made so that the projection desirably effects in preventing a dendrite of lithium or zinc from being grown. The size of the projection should be properly determined depending upon the radius of curvature of the protrusion and the voltage applied. However, in general, it is desired to be 1/100 or more of the distance between the anode and the cathode.

FIGS. 2(a), 2(b), 2(c) and 2(d) are schematic cross-sectional views each illustrating a preferable example of an anode usable in a rechargeable battery according to the present invention.

Figure 2A:
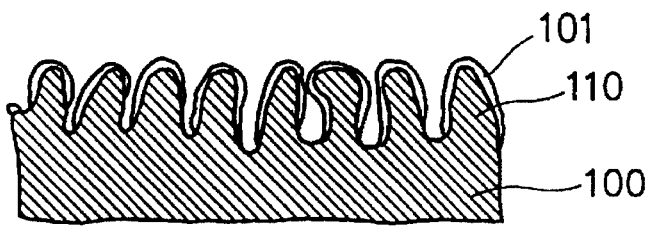
FIG. 2(a) is a schematic cross-sectional view illustrating an example of an anode in a rechargeable battery according to the present invention.

Particularly, the anode shown in FIG. 2(a) comprises a electrically conductive material 100 capable of serving also as an anode collector, having a plurality of protrusions 110 present at the outermost side thereof which is contacted with an electrolyte (not shown) and is opposed to a cathode (not shown), wherein the protrusions 110 are covered by a film 101 composed of an insulating material or a semiconductor material while forming a coat-free opening (or a coat-free pore) in a groove-like form in which the electrically conductive material is exposed, between each adjacent protrusions.

Figure 2B:
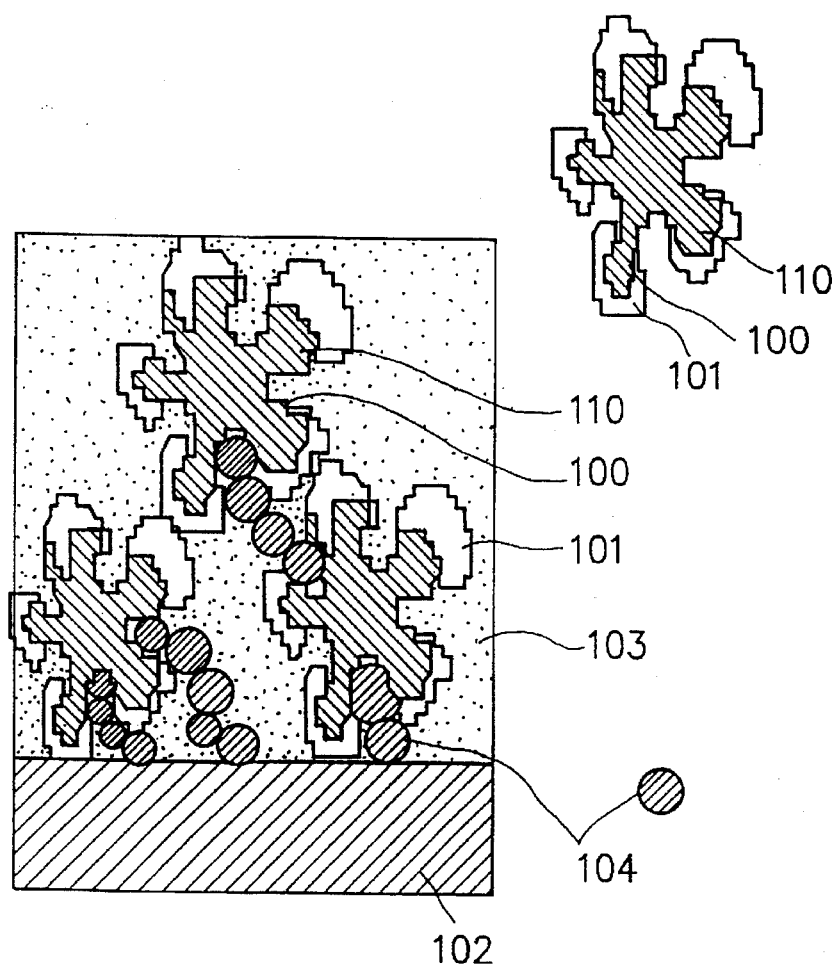
FIG. 2(b) is a schematic cross-sectional view illustrating another example of an anode in a rechargeable battery according to the present invention.

The anode shown in FIG. 2(b) comprises an anode material comprising a mixture of powdery electrically conductive material 100 and particles 104 of an electrically conductive auxiliary, which is bonded onto the surface of an anode collector member 102 by means of an adhesive 103, wherein protrusions 110 present at the anode material are covered by a film 101 composed of an insulating material or a semiconductor material while forming a coat-free opening (or a coat-free pore) in a groove-like form in which the anode material is exposed, between each adjacent protrusions. In this case, the outermost side of the anode material is contacted with an electrolyte (not shown) and is opposed to a cathode (not shown).

As above described, in any of the anodes shown in FIGS. 2(a) and 2(b), it is necessary for the electrically conductive surface of the anode to be designed such that it is not entirely covered by the insulating or semiconductor film but it has the aforesaid groove-like shaped, exposed regions (that is, the groove-like shaped coat-free openings) through which the electrically conductive material of the anode can be contacted with the electrolyte. In any of FIGS. 2(a) and 2(b), as above described, there is said groove-like shaped, exposed region in which the electrically conductive material is exposed, between each adjacent protrusions 110.

In the formation of each of the anodes shown in FIGS. 2(a) and 2(b), a due care should be made so that the anode has a sufficient specific surface area in terms of the substantial, exposed electrically conductive surface area to be contacted with the electrolyte.

Figure 2C:
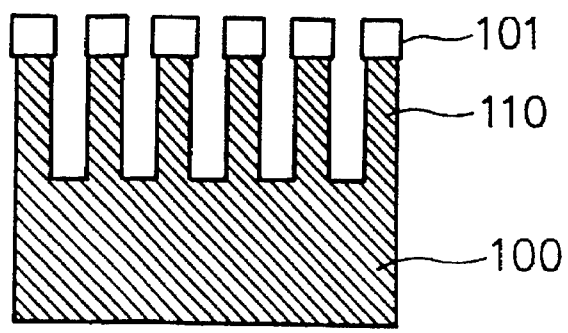
FIG. 2(c) is a schematic cross-sectional view illustrating a further example of an anode in a rechargeable battery according to the present invention.

The anode shown in FIG. 2(c) is a modification of the anode shown in FIG. 2(a), wherein the depth of the groove-like shaped, coat-free region between each adjacent protrusions 110 in FIG. 2(a) is increased, or in other words, each of the protrusions 110 respectively covered by the insulating or semiconductor film 101 in FIG. 2(a) is modified to have a coat-free region with a prolonged length, so that the anode has an exposed electrically conductive surface with a great specific surface area.

Figure 2D:
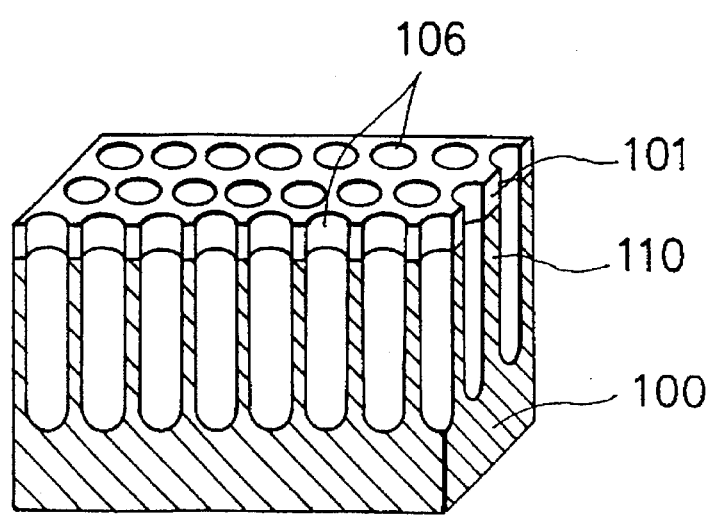
FIG. 2(d) is a schematic cross-sectional view illustrating an additional example of an anode in a rechargeable battery according to the present invention.

The anode shown in FIG. 2(d) is of a configuration having a cross-sectional structure similar to that of the anode shown in FIG. 2(c). The anode shown in FIG. 2(d) is configured to have a large number of coat-free groove-like shaped openings (or pores) 106 which are extending through an insulating or semiconductor film 101 into an electrically conductive material 100 at an increased depth as shown in the figure, wherein the electrically conductive material 100 contacts with an electrolyte solution (not shown) through said groove-like shaped openings. Particularly, the electrically conductive material 100 is provided with a large number of coat-free groove-like shaped openings (or pores) 106 having a large length which are spacedly arranged in parallel to each other such that they are extending from the side where the electrically conductive material 100 is contacted with an electrolyte (not shown) and opposed to a cathode (not shown), toward the opposite side of the electrically conductive material, wherein each of the groove-like shaped openings has an exposed circumferential wall having a recess which is comprised of the electrically conductive material. In this case, portions 110 of the electrically conductive material in which the groove-like shaped openings are excluded constitute protrusions. And the insulating or semiconductor film 101 is convergently formed at an outermost surface portion of each of the portions 110 (namely, the protrusions) at which an electric field is centralized upon operating charging so as to form openings (or pores) at the insulating or semiconductor film so that said openings communicate with the groove-like shaped openings of the electrically conductive material.

In the case of the anode's configuration shown in FIG. 2(c) or 2(d), there can be attained a greatly increased specific surface area in terms of the substantial, exposed electrically conductive surface area to be contacted with the electrolyte which corresponds to about 1000 times or more of the surface area of the original electrically conductive material with no deposition of the insulating or semiconductor film, by properly increasing the arrangement density of the foregoing groove-like shaped openings or/and the depth of each of the foregoing coat-free groove-like shaped openings. A rechargeable battery provided with such anode has pronounced advantages such that the current density at the anode's surface upon operating charging is markedly decreased, the generation or growth of a dendrite of lithium or zinc is very effectively prevented, an electrolyte is effectively prevented from being decomposed, and thus, the charging and discharging cycle life is markedly prolonged. In addition, the use of this anode can attain a rechargeable battery which is capable of performing high speed charging and discharging cycle at a high efficiency.

Figure 3:
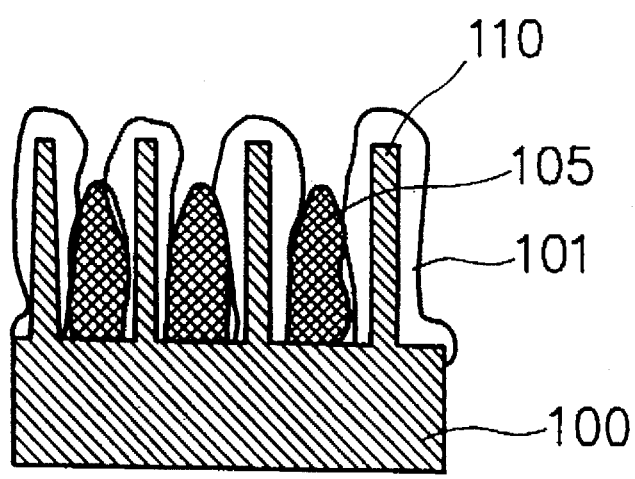
FIG. 3 is a schematic cross-sectional view for explaining a case wherein an active material is deposited in an anode in the present invention.

FIG. 3 is a schematic cross-sectional view of an imaginary example for explaining a case wherein upon operating charging, an active material 105 is deposited at a pore portion between each adjacent protrusions 110 present at a electrically conductive anode member 100 are covered by a insulating or semiconductor film 101, wherein said pore portion remain without being covered by the insulating or semiconductor film.

Description will be made of the situation shown in FIG. 3.

In general, upon operating charging, the active material 105 is deposited on a surface portion of the electrically conductive member 100 which is contacted with an electrolyte. In the case where the protrusions 110 are present at the surface of the electrically conductive anode member 100, an electric field is centralized at such protrusion and the active material 105 is deposited along lines of electric force. However, when each protrusion 110 is covered by the insulating or semiconductor film 101 in such a way as shown in FIG. 3, no electric field is centralized at the protrusion, and an electric field is effected to the electrically conductive anode member 100 situated in an opening (specifically the bottom portion of the pore) between each adjacent protrusions 110, wherein the active material 105 is deposited on the portion of the electrically conductive anode member to which the electric field is effected. And as the deposition of the active material 105 proceeds as shown in FIG. 3, the active material accordingly becomes to contact with the protrusion 110 or the insulating or semiconductor film 101 of covering the protrusion, wherein the active material 105 is prevented from further growing. By this, the generation of a dendrite is prevented or if it should be generated, its growth is prevented. Further, the area of the active material 105 to be contacted with an electrolyte is decreased, and because of this, the probability of causing the generation of a dendrite is minimized.

Further, in the case where the anode is designed to have an increased specific surface area with respect to the electrically conductive surface as shown in FIG. 2(c), by adjusting the depth of each of the foregoing groove-like shaped coat-free openings and the arrangement density of the coat-free opening, a markedly increased specific surface area can be easily attained for the electrically conductive surface of the anode.

A rechargeable battery provided with such anode has pronounced advantageous in that the substantial current density upon operating charging is extremely reduced, the charging and discharging efficiency is remarkably improved, the generation or growth of a dendrite of lithium or zinc is effectively prevented, and the charging and discharging cycle is markedly prolonged.

Figure 4:
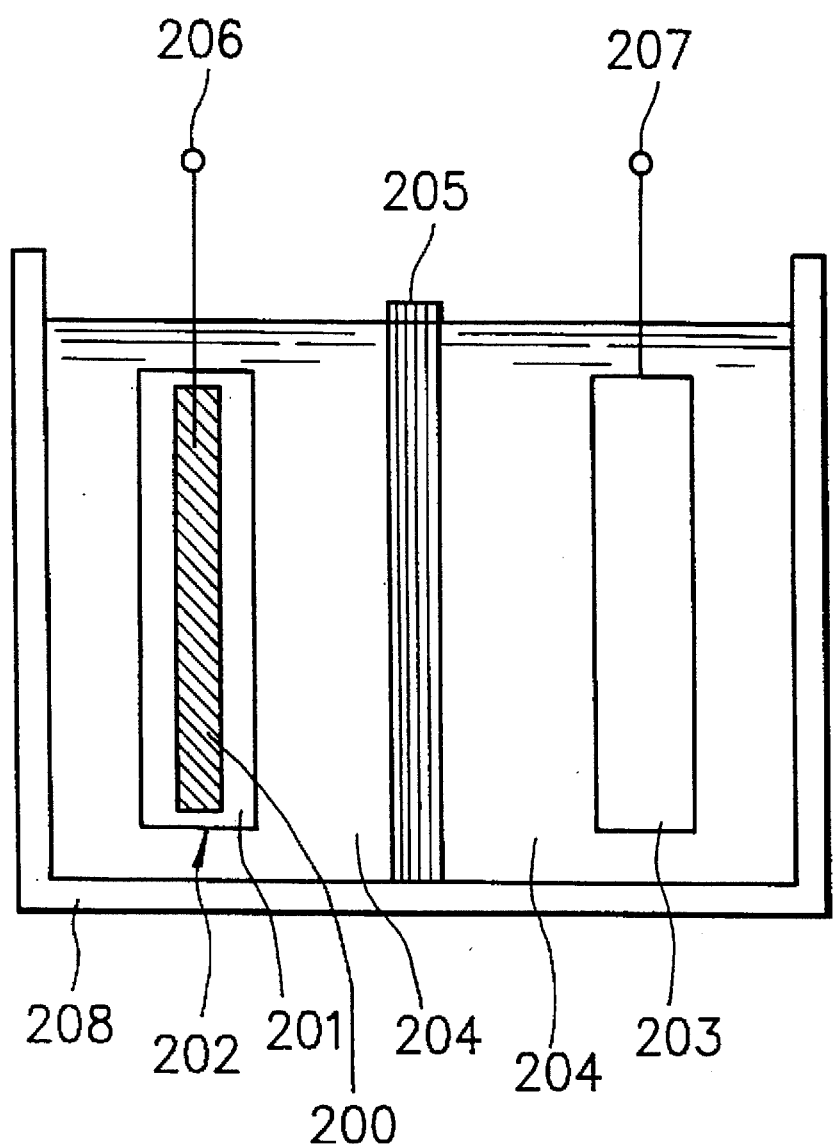
FIG. 4 is a schematic diagram illustrating the constitution of an example of a rechargeable battery according to the present invention.

FIG. 4 is a schematic diagram illustrating the constitution of an example of a rechargeable battery according to the present invention, in which any of the foregoing anodes, a cathode, a separator and an electrolyte (or an electrolyte solution) are combined.

In FIG. 4, reference numeral 202 indicates an anode comprising an anode collector 200 and an electrically conductive member 201 provided with a film composed of an insulating material or a semiconductor material such that protrusions present at the surface of said electrically conductive member are covered by said film as above described, reference numeral 203 a cathode, reference numeral 204 an electrolyte (or an electrolyte solution), reference numeral 205 a separator, reference numeral 206 an anode terminal, reference numeral 207 a cathode terminal, and reference numeral 208 a housing.

In the present invention, the anode is specifically structured as above described. That is, the electrically conductive protrusions present at the surface (or the outermost side) of the anode are covered by the insulating or semiconductor film such that at least their limited portions to which an electric field is locally centralized are covered by said film. In the rechargeable battery according to the present invention which is provided with the specific anode, local centralization of an electric field to such electrically conductive protrusions present at the anode do not occur upon the impression of an electric field at the time of operating charging, wherein the current density at the surface of the anode is uniform, whereby a dendrite of lithium or zinc is prevented from generating or if said dendrite should be generated, it is prevented from growing.

As for the anode of the rechargeable battery according to the present invention, when the sum of the capacities of the foregoing openings provided by the electrically conductive material and the insulating or semiconductor film is made to be greater than the sum of the volumes of the active materials deposited upon operating charging, the total area for the active materials deposited to be contacted with an electrolyte can be reduced, wherein the growth of a dendrite of lithium or zinc is further effectively prevented. By this, the cycle life (that is, the charging and discharging cycle life) of the rechargeable battery is further prolonged.

In the present invention, as the insulating or semiconductor film formed to cover the electrically conductive protrusions present at the surface (or the outermost side) of the anode such that at least their limited portions to which an electric field is locally centralized are covered by said film, it is desired to comprise one or more films selected from the group consisting of films formed by an electrochemical film-forming process, i.e., a film formed by anode oxidation (hereinafter refereed to as anode oxidation oxide film), a film formed by anodic deposition (hereinafter referred to as anodic deposition film), a film formed by cathodic deposition (hereinafter referred to as cathodic deposition film), a film formed from a monomer or oligomer by electropolymerization (hereinafter referred to as electropolymerization film), a polymer film formed by electrophoretic electrodeposition (hereinafter referred to as electrodeposition polymer film), and an oxide film formed by electrophoretic electrodeposition (hereinafter referred to as electrodeposition oxide film).

In the present invention, the formation of the insulating or semiconductor film in such state as above described may be conducted by an appropriate electrochemical coat-forming process using an appropriate treating electrolyte solution such as anodic oxidation. The electrochemical coat-forming process can include anodic deposition, cathodic deposition, electro-polymerization, or electrophoreic electrodeposition. These coat-forming processes may be used either singly or in combination of two or more of them.

In any of these coat-forming processes, a film is first formed convergently at an electrically conductive portion such as a protrusion present at the surface of an electrically conductive material to which an electric field is liable to centralize. In the case where said film is an insulating film or a semiconductor film which is high in resistance, when said electrically conductive protrusion is coated with said film, no electric current is not flown thereto. When the application of an electrolysis electric current is still continued after the film formation, said film is deposited on other portions of the surface of the electrically conductive material.

In the present invention, an insulating film or a semiconductor film (these films will be hereinafter collectively referred to as insulating or semiconductor film) can be formed selectively at desired portions of the protrusions present at the anode by properly adjusting the related film-forming conditions including the voltage applied, the reaction time, and the like. In order to thicken the thickness of the insulating or semiconductor film formed at each protrusion, it is desired that the film-forming conditions including the kind of a treating electrolyte solution used and the electrolysis conditions are properly selected so that an insulating or semiconductor film can be formed at each protrusion present at the electrically conductive material at an increased thickness and an insulating or semiconductor film having a porous structure is deposited at the remaining portion of the surface of the electrically conductive material. Such porous film has a number of minute holes and because of this, those minute holes are communicated with the surface of the electrically conductive material so that said surface can be contacted with an electrolyte for a rechargeable battery through said minute holes. Such porous film deposited at other portions than the protrusions can be easily removed while retaining the film deposited at each protrusion and exposing the surface of the electrically conductive material excluding the protrusions coated with the film by an appropriate manner which will be later described.

Now, as above described, in the foregoing electrochemical coat-forming process, electrochemical reaction is first occurring selectively for a limited portion of an electrically conductive protrusion which is great in field strength. Therefore, a insulating or semiconductor film can be deposited convergently at an electrically conductive protrusion or the like having a great field strength, wherein there can be relatively easily attained an apparently uniform electric field.

In the case where the anodic oxidation process using an appropriate treating electrolyte solution is conducted for a metal as the electrically conductive material of the anode, a reaction of eluting a metal ion while causing the deposition of a metal oxide film is occurring, wherein pores of being communicated with the surface of the electrically conductive material are desirably formed. Thus, there can be attained an increased specific surface area for the anode. The anodic oxidation process is desirable also for forming the insulating or semiconductor film for the electrically conductive protrusions present at the surface (or the outermost side) of the anode such that at least their limited portions to which an electric field is locally centralized are covered by said film. In the case of employing the anodic oxidation process, not only the conditions as for the electrolyte but also the conditions as for the electrolysis should be properly determined so that an oxide film with a porous structure can be formed.

Now, in the case where the anode has a great specific surface area, there is attained a reduction in the substantial current density upon operating charging. In addition to this, when the anode active material is lithium or zinc, the generation or growth of a dendrite of lithium or zinc is desirably prevented.

As the foregoing treating electrolyte solution, when a treating electrolyte solution containing a component capable of etching the electrically conductive material constituting the anode is used upon forming the insulating or semiconductor film at the electrically conductive protrusions present at the anode such that at least their limited portions to which an electric field is locally centralized are covered by said film, the insulating or semiconductor film formed becomes to have a number of pores which are communicated with the surface of the electrically conductive material of the anode. By this, the generation or growth of a dendrite of lithium or zinc is desirably prevented.

Alternatively, the formation of such number of pores at the insulating or semiconductor film may be conducted in a manner wherein an insulating or semiconductor film is first formed convergently at the electrically conductive protrusions present at the anode, and thereafter, the resultant is subjected to etching treatment. In this case, there can be attained such configuration as shown in FIG. 2(c). In this case, the formation of the insulating or semiconductor film can be conducted by a coating process by way of sol-gel transformation, a CVD process such as a thermal-induced CVD process, plasma CVD process or laser CVD process, a sputtering process, an electron beam evaporation process, a thermal oxidation process, a plasma oxidation process, an anodic oxidation process, or an electrodeposition process. In the case where the anodic oxidation process or the thermal oxidation process is employed, an oxide film having a porous structure can be formed by properly selecting appropriate film-forming conditions, and pore portions which communicate with the surface of the electrically conductive material can be easily formed. Such pore portions may be formed by any of the following two manners: a manner wherein prior to the film formation, a negative pattern for the formation of said pore portions is formed on an object using a resist, the film formation is conducted, and the resist is removed by a lift-off technique; and a manner wherein after the film formation, a positive pattern for the formation of said pore portions is formed on the resultant using a photoresist, followed by conducting wet etching or dry etching.

Before or after the above treatment for the anode, it is possible to conduct etching treatment for the surface of the anode. Particularly, when prior to the foregoing electrochemical film-forming process by way of anodic oxidation, anodic deposition, cathodic deposition, electropolymerization, or electrophoretic electrodeposition using an appropriate treating electrolyte solution, etching treatment is conducted for the surface of the anode, there can be attained an increased specific surface area for the anode. To make the anode to have an increased specific surface area provides advantages in that the substantial current density upon operating charging is reduced, the generation or growth of a dendrite of lithium or zinc is desirably prevented, and occurrence of side reactions such as decomposition reaction of an electrolyte solution for a rechargeable battery is desirably prevented.

In the case where etching treatment is conducted for the surface of the anode after the formation of the insulating or semiconductor film by the foregoing electrochemical film-forming process by way of anodic oxidation, anodic deposition, cathodic deposition, electrolytic polymerization, or electrophoretic electrodeposition using an appropriate treating electrolyte solution, the insulating or semiconductor film formed becomes to have an increased number of pores which are communicated with the surface of the electrically conductive material of the anode, wherein the sum of the capacities of the pores (hereinafter referred to as total pore capacity) is increased accordingly. In the case where the total pore capacity is increased like this, the area for the active material of lithium or zinc deposited upon operating charging (see, FIG. 3) to be subjected to chemical reaction with an electrolyte solution for a rechargeable battery is reduced. This leads to prolonging the charging and discharging cycle life of the rechargeable battery.

Further, it is possible to subject the above insulating or semiconductor film with an increased number of pores communicated with the surface of the electrically conductive material to further etching treatment. In this case, the area of the surface of the electrically conductive material which substantially contacts with an electrolyte for a rechargeable battery can be remarkably increased. In a rechargeable battery provided with such anode, the substantial current density upon operating charging is significantly reduced, and because of this, the generation or growth of a dendrite of lithium or zinc is effectively prevented, and the electrolyte solution is effectively prevented from being decomposed.

The foregoing electrochemical film-forming process by way of anodic oxidation, anodic deposition, cathodic deposition, electro-polymerization, or electrophoretic electrodeposition may be conducted while applying an electric field selected from the group consisting of direct electric field, alternate electric field, pulse electric field, and combinations of these between a counter electrode and the anode for a rechargeable battery as an object to be treated in an appropriate treating electrolyte solution. In this case, when an alternate electric field is applied, deposition reaction of forming the insulating or semiconductor film effectively proceeds, wherein etching reaction can be conducted simultaneously together with the deposition reaction. In this case, the foregoing pores communicated with the electrically conductive material constituting the anode are more effectively formed. When a pulse electric field is applied, the control for the insulating or semiconductor film to be formed for the protrusions of the anode can be conducted as desired even when the treating electrolyte solution is of a high resistance value.

The foregoing electrochemical film-forming process or the foregoing etching treatment may be conducted by using an appropriate aqueous solution as the treating electrolyte solution or the etching solution. In this case, it is desired that the anode having been treated is immersed in an organic solvent having a boiling point of 200° C. or less and capable of forming an azeotropic mixture with water to substitute the moisture contained in the anode by the organic solvent and the resultant is subjected to drying under reduced pressure.

The coating film comprising the insulating or semiconductor film formed by the electrochemical film-forming process using the aqueous solution as the treating electrolyte solution has a number of pores with water absorbed in their insides. This entails a serious problem particularly in the case of a rechargeable battery in which the anode active material is lithium in that the absorbed water is reacted with lithium deposited upon operating charging to form a lithium compound which is hardly eluted, whereby causing a reduction in the charging capacity.

Anyway, the above-described absorbed water cannot be sufficiently removed by the ordinary drying manner. However, the foregoing substitution treatment with the organic solvent makes it possible to sufficiently remove the absorbed water in the anode. By this, the formation of the foregoing lithium compound is prevented. Particularly, by substituting the absorbed water by the organic solvent as above described, if the organic solvent should be remained in the pores of the anode, occurrence of the foregoing reaction of water with lithium deposited is prevented. And since the foregoing organic solvent is used, the boiling point of the solvent upon its vaporization can be reduced to be lower than that of water, and because of this, the water removal can be easily and effectively conducted by the drying under reduced pressure.

In any case, the organic solvent used is desired to be easily removed upon drying the anode. And in view of the boiling point upon conducting the substituting treatment, it is desired to be preferably of a boiling point of 200° C. or less, more preferably of a boiling point of 100° C. or less.

In the present invention, after forming the insulating or semiconductor film selectively for the protrusions present at the anode by the foregoing electrochemical film-forming process by way of anodic oxidation, anodic deposition, cathodic deposition, electro-polymerization, or electrophoretic electrodeposition, water-repelling treatment may be conducted for the resultant anode. In this case, there can be attained a remarkable reduction in the amount of water, which reacts with lithium deposited upon operating charging, to be absorbed in the anode.

In the following, description will be made of each constituent of a rechargeable battery according to the present invention.

ANODE

The anode disposed in a rechargeable battery according to the present invention basically comprises an electrically conductive material and an insulating or semiconductor film disposed to cover protrusions present at the electrically conductive material such that at least limited portions of the protrusions to which an electric field is locally centralized are covered by said film.

Specifically, the electrically conductive material comprises one or more members selected from the group consisting of Al, Ti, Mg, W, Mo, Pb, Si, Ge, Zr, Tl, Nb, Hf, Sb, Cu, Ni, Cr, Fe, Pt, and Au. Alternatively, it may comprise an alloy material such as stainless steel.

The electrically conductive material may be shaped in a plate-like form, foil-like form, mesh form, porous form-like sponge, punching metal form, expanded metal form, fibrous form, power-like form, flake-like form, or cloth-like form.

In the case where the electrically conductive material is shaped to have a powdery form, flake-like form or fibrous form which cannot retain a stabilized form capable of serving as an electrode as it is, it is possible to make into a stable form by using an appropriate binding agent such as alkali-glass or binder resin. The resultant thus obtained may be sintered. In this case, other than the binder, an electrically conductive auxiliary may be used in order to improve the current collecting property of the electrically conductive material. The binding agent used is desired to be stable to an electrolyte solution used in a rechargeable battery. Specific examples of the binder resin are polytetrafluoroethylene, polyvinylidene fluoride, polyethylene, polypropylene, ethylene-propylene copolymer, and ethylene-propylene-diene-terpolymer. Specific examples of the electrically conductive auxiliary are carbon blacks such as ketjen black and acetylene black, and powdery or fibrous carbons such as graphite. It is possible that an electrically conductive material in a powdery form, fibrous form, or flake-like form is applied onto to the surface of an electrically conducted material in a plate-like form, foil-like form, mesh form, porous form-like sponge, punching metal form, expanded metal form, or cloth-like form by means of an appropriate coating manner while bonding the formed to the surface of the latter by means of a binding agent, to thereby form an anode. The coating manner in this case can include screen printing, coater coating, and spray coating.

In the present invention, any of the above anodes comprising an electrically conductive material is subject to surface treatment as previously described. That is, an insulating or semiconductor film is formed such that at least protrusions present at the anode's surface by the foregoing electrochemical coat-forming process and openings (or pores) are formed such that they are communicated with the recesses remained between the protrusions on the anode's surface, or an insulating or semiconductor film is formed convergently at protrusions present at the anode's surface but for the recesses between the protrusions. In any of these cases, if necessary, before or after the film formation, etching treatment is conducted in the foregoing manner.

As previously described, as the electrochemical coat-forming process, there can be employed the anodic oxidation process, anodic deposition process, cathodic deposition process, electro-polymerization process, or electrophoreic electrodeposition process.

In the case of the anodic oxidation process, when the electrically conductive material constituting the anode comprises Al, Ti, Mg, W, Mo, Pb, Si, Ge, Zr, Tl, Nb, Hf, or Sb, there can be used, as the treating electrolyte solution, an aqueous solution of a compound selected from the group consisting of sulfuric acid, oxalic acid, phosphoric acid, chromic acid, boric acid, sulfosalicylic acid, phenolsulfonic acid, sodium hydroxide, potassium hydroxide, lithium hydroxide, sodium phosphate, ammonium borate, ammonium tartrate, ammonium phosphate, and malonic acid. As for an coating oxide film formed by the anodic oxidation process, the thickness and density thereof, the total capacity and density as for the pores formed can be optimized by properly selecting the kind of a treating electrolyte aqueous solution used and its concentration and/or by properly adjusting the electric field applying condition. And either by adding a component capable of chemically dissolving the electrically conductive material to the treating electrolyte aqueous solution or by selectively using an appropriate electrolyte aqueous solution, there can be formed, at the resulting coating oxide film, openings (or pores) of being communicated with the recesses between the protrusions on the surface of the electrically conductive material.

In the case of the anodic deposition process, there can be formed a coating film of a metal oxide such as nickel oxide, cobalt oxide, manganese oxide, copper oxide, or indium oxide by conducting anodic-deposition using, as the treating electrolyte solution, an aqueous solution of a simple salt of a metal selected from the group consisting of Ni, Co, Mn, Cu, and In or a complex of one of these metals.

In the case of the electro-polymerization process, a coating polymer film can be formed by applying a desired electric field using a treating electrolyte solution added with a monomer or an oligomer. As the monomer or oligomer, it is not appropriate to use such a monomer or oligomer that makes the resulting coating polymer film to have an electrical conductivity. However, it is possible to use such a monomer or oligomer that makes the resulting coating polymer film to have a sufficiently low electrical conductivity. Specific example of the monomer desirably usable in the present invention are benzocrown ether, furan, and the like. As the treating electrolyte solution, there can be used an electrolyte solution used in a rechargeable lithium battery.

In the case of the electrophoretic electrodeposition process, there can be used, as the treating electrolyte solution, a polymer solution used for electrodeposition, or a sol solution of an inorganic oxide, containing a surface active agent. To form a coating film selectively at the protrusions present at the anode's surface can be conducted by properly adjusting the concentration of the treating electrolyte solution and the concentration of the additive and also by properly adjusting the conditions of the electrolysis.

Now, in the case where the anode active material is lithium, when an active material containing lithium is used as a cathode, an anode in the foregoing preparation manner (the term "anode" herein means an anode prior to subjecting the foregoing surface treatment) can be used as it is. In this case, though the anode does not contain lithium, lithium contained in the cathode will be deposited upon operating charging, wherein the lithium thus deposited functions as an anode active material. When an active material not containing lithium is used as a cathode, lithium is incorporated into the anode's electrically conductive material, or a lithium-containing alloy is used as the anode's electrically conductive material.

In the case where the anode active material is zinc, an anode which is prepared in the foregoing manner is galvanized to deposit zinc therein and the resultant is used. Alternatively, it is possible that zinc is incorporated into an electrically conductive material used upon preparing an anode in the foregoing anode preparation manner. Other than these, it is possible to use a zinc-containing alloy as the anode's electrically conductive material.

As previously described, the etching treatment to an anode prior to conducting the electrochemical coat-forming process for the anode provides an effect of attaining an increased specific surface area. And the etching treatment after the film formation for the anode by the electrochemical coat-forming process provides an effect of increasing the total capacity of the pores formed through the insulating or semiconductor film, said pores being communicated with the surface of the anode's electrically conductive material.

The manner of conducting the etching treatment can include chemical etching, electrochemical etching, and plasma etching.

The chemical etching is conducted in a manner wherein an object to be treated is contacted with an etching solution containing an acid or alkali, wherein the object is reacted with the acid or alkali of the etching solution to thereby etch the object. As the etching solution in the case where the anode's electrically conductive material comprises Al, there can be used solutions of acids such as phosphoric acid, sulfuric acid, hydrochloric acid, nitric acid, hydrofluoric acid, and acetic acid; solutions of two or more of these acid solutions; solutions of bases such as potassium hydroxide, sodium hydroxide, lithium hydroxide, and ethylenediamine; and solutions of two or more of these base solutions.

As the etching solution in the case where the anode's electrically conductive material comprises Ni, there can be used solutions of dilute acids such as nitric acid.

As the etching solution in the case where the anode's electrically conductive material comprises Cu, there can be used solutions of acids such as sulfuric acid, hydrochloric acid, nitric acid, and acetic acid. Other than these, there can be also used a solution of ferric chloride, a solution of cupric chloride, and aqueous ammonia.

As the etching solution in the case where the anode's electrically conductive material comprises Ti, there can be used solutions acids such as hydrofluoric acid and phosphoric acid.

The electrochemical etching is conducted in a manner wherein a predetermined electric field is applied between an object to be treated and a counter electrode in a treating electrolyte solution of a given electrolyte to elute a metal ion from the object. As the electrolyte in the case where the anode's electrically conductive material comprises Al, there can be mentioned phosphoric acid, sulfuric acid, chromic acid, hydrochloric acid, sodium chloride, and potassium chloride. As the electrolyte in the case where the anode's electrically conductive material comprises Cu, there can be mentioned phosphoric acid, hydrochloric acid, sodium chloride, and potassium chloride.

The plasma etching is conducted in a manner wherein an object to be treated is placed in a vacuum vessel, an etching gas is introduced into therein, and plasma is generated from the etching gas to produce reactive ions and radicals, whereby etching the object. The etching gas can include tetrachloromethane gas, tetrafluoromethane gas, chlorine gas, trichloromonofluoromethane gas, dichlorodifluoromethane gas, and chlorotrifluoromethane gas.

In the present invention, it is possible that the insulating or semiconductor film formed by the foregoing electrocheminal coat-forming process as above described is subjected to water repelling treatment in order to prevent the insulating or semiconductor film from absorbing moisture. The water repelling treatment can include a manner of applying a fluororesin to said film by a coating process, a plasma coating process, or a sputtering process. Other than this, electrolytic plating and electroless plating respectively using a liquid comprising a plating solution of a metal salt containing a fluororesin oligomer and a surface active agent dispersed therein are also usable.

As above described, the anode of the present invention is provided with an insulting or semiconductor film such that at least protrusions present at the anode are covered by said film.

Other than this, in the present invention, it is possible for the anode to have a coating comprised of an insulating or semiconductor material capable of selectively allowing a lithium ion or a hydroxide ion to pass through but incapable of allowing a lithium metal or a zinc metal deposited to pass through on the surface thereof. This improves the effect of preventing the generation or growth of a dendrite of lithium or zinc.

Such coating material can include films having a number of minute perforations capable of selectively allowing a lithium ion or a hydroxide ion to pass through and films formed of a material having a molecular structure capable of selectively allowing a lithium ion or a hydroxide ion to pass through. Examples of such material having a molecular structure capable of selectively allowing a lithium ion to pass through are large ring ether structure-bearing high-molecular compounds and ether linkage-bearing high-molecular compounds.

The film having such minute perforations can be formed by using a given coating liquid containing a component capable of being eluted after having formed a coating film such as an electrolyte salt or a given coating liquid containing a foaming agent or a component capable of being readily thermally decomposed.

CATHODE

The cathode generally comprises a cathode active material, and if necessary, a cathode collector, an electrically conductive auxiliary, a binding agent and the like.

The cathode is usually formed, for example, by disposing a mixture of a cathode active material, an electrically conductive auxiliary and a binding agent on a member capable of serving as a cathode collector.

The electrically conductive auxiliary can include powdery or fibrous aluminum, copper, nickel, stainless steel and graphite, and other than these, carbon blacks such as ketjen black and acetylene black.

The binding agent is desired to be stable for an electrolyte used in a rechargeable battery.

Specific examples of such binding agent in the case where a nonaqueous series electrolyte is used are fluorine-containing resins and polyolefines such as polytetrafluoroethylene, polyvinylidene fluoride, polyethylene, polypropylene, ethylene-propylene copolymer, and ethylene-propylene-diene-terpolymer.

Specific examples of the binding agent in the case where an aqueous series electrolyte is used are polivinyl alcohols, celluloses, and polyamides.

The cathode collector serves to supply an electric current so that it can be efficiently consumed for the electrode reaction upon conducting the charging and discharging or to collect an electric current generated. The cathode collector is therefore desired to be constituted by a material which has a high electrical conductivity and is inactive to the battery reaction.

The material by which the cathode collector is constituted can include Ni, Ti, Cu, Al, Pt, V, Au, Zn, and alloys of two or more of these metals such as stainless steel.

The cathode collector may be shaped in a plate-like form, foil-like form, mesh form, porous form-like sponge, punching metal form, or expanded metal form.

Herein, as for the cathode used in the rechargeable zinc-oxygen battery, it comprises a cathode collector, a catalyst, and a water repellant.

Description will be made of the cathode active material usable in the present invention.

The cathode active material is different depending upon the kind of a rechargeable battery.

The Cathode Active Material In the Case of a Rechargeable Lithium Battery

As the cathode active material in the case of a rechargeable lithium battery, there is usually used a compound selected from transition metal oxides and transition metal sulfides. The metals of these transition metal oxides and transition metal sulfides can include metals partially having a d-shell or f-shell. Specific examples of such metal are Sc, Y, lanthanoids, actinoids, Ti, Zr, Hf, V, Nb, Ta, Cr, Mo, W, Mn, Tc, Re, Fe, Ru, Os, Co, Rh, Ir, Ni, Pd, Pt, Cu, Ag and Au. Of these, Ti, V, Cr, Mn, Fe, Co, Ni and Cu are most appropriate.

The cathode active material is desired to be comprised of any of the above transition metal oxides and transition metal sulfides, which is incorporated with lithium. The lithium-containing cathode active material may be formed by a manner of obtaining a transition metal oxide or transition metal sulfide using lithium hydroxide or lithium salt. Alternatively, it may be formed by a manner of providing a mixture of a given transition metal oxide or transition metal sulfide, and lithium hydroxide, lithium nitrate, or lithium carbonate capable of being readily thermally decomposed, and subjecting said mixture to heat treatment.

The Cathode Active Material In the Case of a Rechargeable Zinc Series Battery

As the cathode active material in the case of a rechargeable nickel-zinc battery, there is usually used nickel oxide or nickel hydroxide.

As the cathode active material in the case of a rechargeable zinc-oxygen battery which comprises a cathode collector, a catalyst, and a water repellant, there is used oxygen. This oxygen is usually supplied from the air. As the catalyst in this case, there is usually used porous carbon material, porous nickel material, or copper oxide. As the water repellant usable, there can be mentioned fluorine-containing resins such as porous tetrafluoroethylene resin.

As the cathode active material in the case of a rechargeable bromine-zinc battery, there is used bromine.

SEPARATOR

The separator is disposed between the anode and the canthode, and it serves to prevent the anode and the cathode from internal-shorts. In addition, the separator also serves to retain the electrolyte.

The separator is required to have a porous structure or a structure having a number of perforations capable of allowing lithium ion or hydroxide ion to pass therethrough and it is also required to be insoluble into and stable to the electrolyte solution.

The separator is usually constituted by a nonwoven fabric or a memberane having a micropore structure made of glass, polypropylene, polyethylene, fluorine-containing resin, or polyamide. Alternatively, the separator may be constituted by a metal oxide film or a resin film combined with a metal oxide respectively having a plurality of perforations. In a preferred embodiment, the separator is constituted by a multilayered metal oxide film. In this case, the separator effectively prevent a dendrite from passing therethrough and because of this, occurrence of internal-shorts between the anode and the cathode is desirably prevented. In another preferred embodiment, the separator is constituted by an incombustible fluorine-containing resin, glass or metal oxide film. In this case, an improvement can be attained in terms of the safety even in the case where such internal-shorts should unexpectedly occur.

ELECTROLYTE

In the present invention, there can be used an appropriate electrolyte as it is, a solution of said electrolyte dissolved in a solvent, or a material of said solution having immobilized using a gelatinizing agent. However, an electrolyte solution obtained by dissolving an appropriate electrolyte in an solvent is usually used in a way that said electrolyte solution is retained on the separator.

The higher the electrical conductivity of the electrolyte, the better. Particularly, it is desired to use such an electrolyte that the electrical conductivity at 25° C. is preferably $1\times10^{-3}$ S/cm or more or more preferably, $5\times10^{-3}$ S/cm or more.

The electrolyte used is different depending upon the kind of a rechargeable battery.

The Electrolyte Usable In the Case of a Rechargeable Lithium Battery

The electrolyte usable in this case can include inorganic acids such as $H_2SO_4$, HCl and $HNO_3$; salts of $Li^+$ (lithium ion) with Lewis acid ion such as $BF_4^-$, $PF_6^-$, $AsF_6^-$, $ClO_4^-$, $CF_3SO_3^-$, or $BPh_4^-$ (with Ph being a phenyl group); and mixtures of two or more of said salts.

Other than these supporting electrolytes, salts of the above described Lewis acids ions with cations such as sodium ion, potassium ion, tetraalkylammonium ion, or the like are also usable.

In any case, it is desired that the above salts are used after they are subjected to dehydration or deoxygenation, for example, by way of heat treatment under reduced pressure.

The solvent in which the electrolyte is dissolved can include acetonitrile, benzonitrile, propylene carbonate, ethylene carbonate, dimethyl carbonate, diethyl carbonate, demethylformamide, tetrahydrofuran, nitrobenzene, dichloroethane, diethoxyethane, 1,2-dimethoxyethane, chlorobenzene, γ-butyrolactone, dioxolan, sulfolan, nitrometane, dimethyl sulfide, dimethyl sulfoxide, methyl formate, 3-methyl-2-oxdazolydinone, 2-methyltetrahydrofuran, 3-propylsydonone, sulfur dioxide, phosphoryl chloride, thionyl chloride, sulfuly chloride, and mixtures of two or more of these.

As for these solvents, it is desired for them to be subjected to dehydration using activated alumina, molecular sieve, phosphorous pentaoxide, or calcium chloride, prior to their use. Alternatively, it is possible for them to be subjected to distillation in an atmosphere composed of inert gas in the presence of an alkali metal, wherein moisture and foreign matters are removed.

In order to prevent leakage of the electrolyte, it is desired for the electrolyte to be gelatinized using an appropriate gelatinizing agent.

The gelatinizing agent usable in this case can include polymers having a property such that it absorbs the solvent of the electrolyte solution to swell. Specific examples of such polymer are polyethylene oxide, polyvinyl alcohol, and polyacrylamide.

The Electrolyte Usable in the Case of a Rechargeable Zinc Series Battery

The electrolyte usable in this case can include alkalis such as potassium hydroxide, sodium hydroxide, lithium hydroxide, and the like; and inorganic salts such as zinc bromide and the like.

In order to prevent leakage of the electrolyte, it is desired for the electrolyte to be gelatinized using an appropriate gelatinizing agent.

The gelatinizing agent usable in this case can include polymers having a property such that it absorbs the solvent of the electrolyte solution to swell. Specific examples of such polymer are polyethylene oxide, polyvinyl alcohol, and polyacrylamide. Other than these, starch is also usable.

SHAPE AND STRUCTURE OF SECONDARY LITHIUM CELL

There is no particular limitation for the shape of the rechargeable battery according to the present invention.

The rechargeable battery according to the present invention may be in the form of a flat round shape (or a coin-like shape), a cylindrical shape, a prismatic shape, or a sheet-like shape.

In the case where the rechargeable battery is shaped in a spiral-wound cylindrical form, the anode, separator and cathode are arranged in the named order and they are spriral-wound and because of this, there are provided advantages such that the battery area can be increased as desired and a high electric current can be flown upon operating the charging and discharging.

In the case where the rechargeable battery is shaped in a prismatic form, there is provided an advantage in that the space of a device for housing the rechargeable battery can be effectively utilized.

As for the structure of the rechargeable battery according to the present invention, it can optionally made to be of a single layer structure or a stacked structure.

Figure 5:
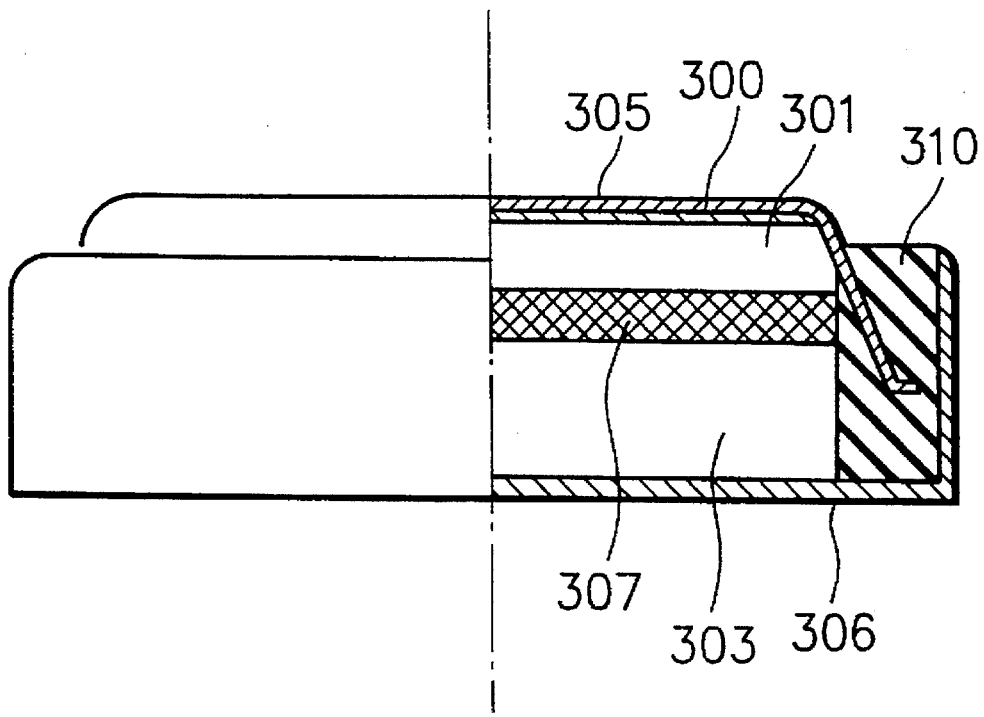
FIG. 5 is a schematic cross-sectional view illustrating an example of a single-layer system flat rechargeable battery according to the present invention.
Figure 6:
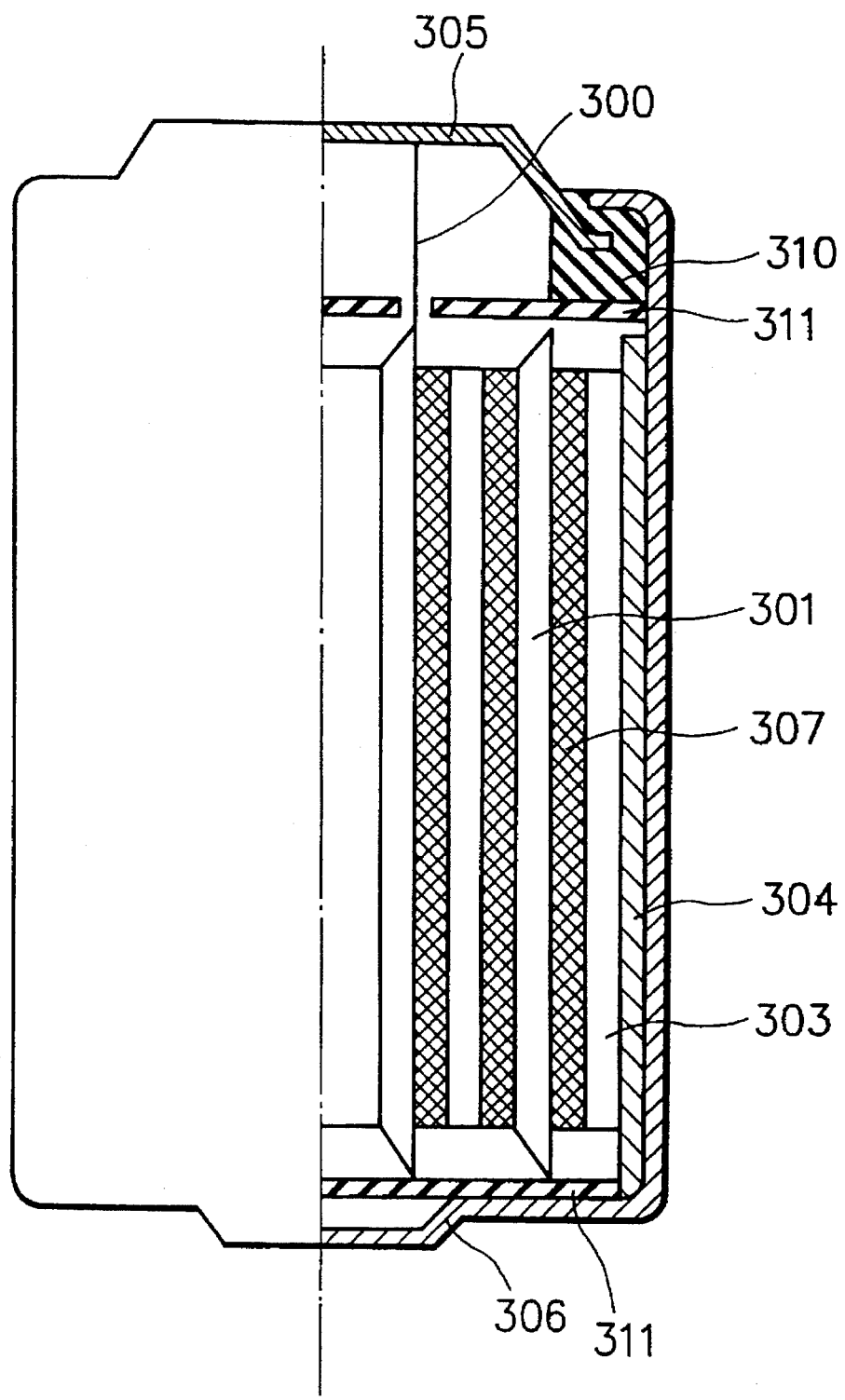
FIG. 6 is a schematic cross-sectional view illustrating an example of a spiral-wound cylindrical rechargeable battery according to the present invention.

FIG. 5 is a schematic cross-sectional view illustrating an example of a single-layer structure type flat rechargeable battery according to the present invention. FIG. 6 is a schematic cross-sectional view illustrating an example of a spiral-wound cylindrical rechargeable battery according to the present invention.

In FIGS. 5 and 6, reference numeral 300 indicates an anode collector, reference numeral 301 a specific anode according to the present invention which is prepared in the foregoing manner, reference numeral 303 a cathode, reference numeral 305 an anode terminal (or an anode cap), reference numeral 306 a cathode can, reference numeral 307 a separator and an electrolyte (or an electrolyte solution), reference numeral 310 an insulating packing, and reference numeral 311 an insulating plate.

The fabrication of a rechargeable battery of the configuration shown in FIG. 5 or FIG. 6 is conducted, for example, in the following manner. That is, a combination comprising the separator 307 interposed between the anode 301 and the cathode 303 is positioned in the cathode can 306. Thereafter, the electrolyte is introduced thereinto. The resultant is assembled with the anode cap 305 and the insulating packing 310, followed by subjecting to caulking treatment. Thus, there is obtained the rechargeable battery.

The preparation of the constituent materials for the rechargeable lithium battery and the fabrication of said rechargeable battery are desired to be conducted in a dry air atmosphere free of moisture or a dry inert gas atmosphere free of moisture in order to prevent occurrence of chemical reaction of lithium with water and also in order to prevent the rechargeable battery from being deteriorated due to chemical reaction of lithium with water in the inside of the battery.

As the constituent of the insulating packing 310, there can be used fluorine-containing resin, polyamide resin, polysulfone resin, or various rubbers. The sealing is typically conducted using a gasket such as the insulating packing, as shown in FIGS. 5 and 6. Other than this, it can be conducted by means of glass sealing, adhesive sealing, welding or soldering.

As the constituent of the insulating plate 311 shown in FIG. 6, there can be used organic resins and ceramics.

Any of the cathode can 306 and the anode cap 305 can be constituted by stainless steel, titanium clad steel, copper clad steel, or nickel-plated steel.

In any of the configurations shown in FIGS. 5 and 6, the cathode can 306 is designed to serve also as a battery housing. In the case where a battery housing is independently used, the battery casing can be constituted by a metal such as zinc, an alloy such as stainless steel, a plastic such as polypropylene, or a composite of a metal or glass fiber with plastic.

Although this is not shown in any of FIGS. 5 and 6, it is possible to employ an appropriate safety vent in any of the configurations shown in FIGS. 5 and 6, which serves to ensure the safety when the iside pressure of the rechargeable battery is incidentally increased, by communicating the inside of the rechargeable battery with the outside to thereby reduce the increased inside pressure of the rechargeable battery. The safety vent may be constituted by an elastic body comprising a rubber or spring or a rupture foil.

In the following, the present invention will be described in more detail with reference to examples, which are only for illustrative purposes but not intended to restrict the scope of the present invention to these examples.

EXAMPLE 1

There was prepared a rechargeable lithium battery of the configuration shown in FIG. 5 in the following manner.
Formation of Anode There was firstly provided a 50 μm thick aluminum foil having a maximum surface roughness of 0.8 um. The aluminum foil was then immersed in an aqueous solution obtained by mixing phosphoric acid, nitric acid, acetic acid, and water with a mixing weight ratio of 20:1:2:2, wherein the surface of the aluminum foil was etched. The aluminum foil thus treated was subjected to anodic oxidation in an aqueous solution containing 56 wt. % of sulfuric acid by applying a DC voltage of 20 V. Then, the resultant was subjected to etching treatment by way of electrolysis to etch the surface thereof using an aqueous solution containing 5 wt. % of hydrochloric acid as a treating electrolyte solution, wherein the film deposited in the above anodic oxidation was used as a mask, and the aluminum foil was used as a positive electrode. The resultant thus etched was washed with pure water, followed by drying, then the water remained therein was removed by way of water substitution using a mixture of acetone and isopropyl alcohol, followed by subjecting to drying under reduced pressure for 3 hours. Thus, there was obtained an anode.
Formation of Cathode Electrolytic manganese dioxide was mixed with lithium carbonate with a mixing weight ratio of 1:0.4, followed by subjecting to heat treatment at 800° C., to thereby obtain a lithium-manganese oxide. With the resultant lithium-manganese oxide, 3 wt. % of powdery acetylene black and 5 wt. % of powdery polyvinylidene fluoride were mixed. The resultant was mixed with N-methyl-2-pyrrolidone to obtain a paste-like product.

The resultant paste-like product was applied onto the surface of an aluminum foil, followed by subjecting to drying. Thus, there was obtained a cathode.
Preparation of Electrolyte Solution There was provided a moisture-free mixed solvent composed of ethylene carbonate (EC) and dimethyl carbonate (DMC) with an equivalent mixing ratio. 1M (mol/l) of tetrafluoro lithium borate was dissolved in the mixed solvent. Thus, there was obtained an electrolyte solution.
Separator There was provided a 25 μm thick polypropylene member having a number of perforations as a separator.
Fabrication of Rechargeable Lithium Battery The fabrication of a rechargeable lithium battery was conducted in a dry argon atmosphere. The separator was interposed between the cathode and the anode, and the resultant was inserted into a cathode can made of titanium clad steel. Then, the electrolyte solution was injected into the cathode can. The resultant was sealed using an anode cap made of titanium clad steel and an insulating packing made of fluoro rubber. Thus, there was obtained a rechargeable lithium battery.

In the rechargeable lithium battery, upon operating charging, the lithium contained in the cathode moves and deposit on the anode to function as an anode active material.

Separately, the above procedures for forming an anode were repeated to obtain an anode. In accordance with the conventional copper decoration process, a predetermined DC voltage was applied between the anode as a negative electrode and a counter electrode in a copper sulfate aqueous solution to deposit copper on the anode. The anode deposited with the copper on the surface thereof was set to a commercially available scanning micro Auger measuring device, wherein the distribution state of the copper deposited on the surface of the anode was examined based on a SEM image (particularly, an image by a scanning electron microscope). As a result, it was found that no copper is deposited at any of the protrusions present at the surface of the anode but copper is selectively deposited at any of the recesses present at the surface of the anode. This means that copper was selectively deposited only at the exposed electrically conductive portions of the surface of the anode.

Hence, it is understood that that in the anode of the above rechargeable lithium battery, a film having a low electrical conductivity is deposited selectively at each of the protrusions present at the surface of the aluminum foil and there are present a number of openings (or pores) between the protrusions which are covered by said film, wherein said openings are communicated with the aluminum foil.

EXAMPLE 2

There was prepared a rechargeable lithium battery in the same manner as in Example 1, except that the anode was formed in the following manner.

The anode was formed in the following manner. That is, powdery Ni—Al alloy containing the Ni in an amount of 50% and the Al in an amount of 50% was mixed with 5 wt. % of powdery polyvinyl alcohol, and the mixture obtained was mixed with N-methyl-2-pyrrolidone to obtain a paste-like product. The paste-like product was applied onto the surface of a 30 µm thick nickel foil in an amount to provide a thickness of 50 µm when dried, followed by drying. The coat formed on the nickel foil was calcined at 650° C. under condition of flowing hydrogen gas. The calcined product was subjected to anodic oxidation in an aqueous solution containing 1 wt. % of hydrogen peroxide and 5 wt. % of potassium hydroxide by applying a DC voltage of 20 V. The resultant was washed with pure water, followed by drying, then the water remained therein was removed by way of water substitution using a mixture of acetone and isopropyl alcohol, followed by subjecting to drying under reduced pressure for 3 hours. Thus, there was obtained an anode.

Separately, the above procedures for forming an anode were repeated to obtain an anode. As well as in Example 1, in accordance with the conventional copper decoration process, copper was deposited on the anode. The anode deposited with the copper on the surface thereof was set to the scanning micro Auger measuring device, wherein the distribution state of the copper deposited on the surface of the anode was examined based on a SEM image.

The examined results revealed that in the anode of the above rechargeable lithium battery, a film having a low electrical conductivity is deposited convergently at each of the protrusions present at the surface of the electrically conductive member comprised of the powdery Ni—Al alloy and there are present a number of openings (or pores) between the protrusions which are covered by said film, wherein said openings are communicated with the electrically conductive member comprised of the powdery Ni—Al alloy.

EXAMPLE 3

There was prepared a rechargeable lithium battery in the same manner as in Example 1, except that the anode was formed in the following manner.

The anode was formed in the following manner. That is, 60 wt. % of powdery aluminum (Al), 35 wt. % of powdery magnesium (Mg), and 5 wt. % of powdery polyvinyl alcohol were mixed to obtain a mixture. The mixture obtained was mixed with N-methyl-2-pyrrolidone to obtain a paste-like product. The paste-like product was applied onto the surface of a 35 µm thick copper foil in an amount to provide a thickness of 50 µm when dried, followed by drying. The coat formed on the copper foil was calcined at 650° C. under condition of flowing hydrogen gas. The calcined product was subjected to anodic oxidation in an aqueous solution containing 23 wt. % of sulfuric acid by applying a DC pulse of 30 V. The resultant was washed with pure water, followed by drying, then the water remained therein was removed by way of water substitution using a mixture of acetone and isopropyl alcohol, followed by subjecting to drying under reduced pressure for 3 hours. Thus, there was obtained an anode.

Separately, the above procedures for forming an anode were repeated to obtain an anode. As well as in Example 1, in accordance with the conventional copper decoration process, copper was deposited on the anode. The anode deposited with the copper on the surface thereof was set to the scanning micro Auger measuring device, wherein the distribution state of the copper deposited on the surface of the anode was examined based on a SEM image.

The examined results revealed that in the anode of the above rechargeable lithium battery, a film having a low electrical conductivity is deposited convergently at each of the protrusions present at the surface of the electrically conductive member comprised of the powdery Al and the powdery Mg and there are present a number of openings (or pores) between the protrusions which are covered by said film, wherein said openings are communicated with the electrically conductive member comprised of the powdery Al and the powdery Mg.

EXAMPLE 4

There was prepared a rechargeable lithium battery in the same manner as in Example 1, except that the anode was formed in the following manner.

That is, there was firstly provided a 50 µm thick titanium foil having a rough surface. The titanium foil was immersed in an aqueous solution comprised water and hydrofluoric acid with a mixing weight ratio of 1:19, wherein the surface of the titanium foil was etched. The titanium foil thus treated was subjected to anodic oxidation in an aqueous solution containing 6 wt. % of sulfuric acid and 1 wt. % of hydrofluoric acid by applying a DC voltage of 20 V. The resultant was washed with pure water, followed by drying, then the water remained therein was removed by way of water substitution using acetone, followed by subjecting to drying under reduced pressure. Thus, there was obtained an anode.

Separately, the above procedures for forming an anode were repeated to obtain an anode. As well as in Example 1, in accordance with the conventional copper decoration process, copper was deposited on the anode. The anode deposited with the copper on the surface thereof was set to the scanning micro Auger measuring device, wherein the distribution state of the copper deposited on the surface of the anode was examined based on a SEM image.

The examined results revealed that in the anode of the above rechargeable lithium battery, a film having a low electrical conductivity is deposited convergently at each of the protrusions present at the surface of the electrically conductive member comprised of the titanium foil and there are present a number of openings (or pores) between the protrusions which are covered by said film, wherein said openings are communicated with the electrically conductive member comprised of the titanium foil.

EXAMPLE 5

There was prepared a rechargeable lithium battery in the same manner as in Example 1, except that the anode was formed in the following manner.

That is, there was firstly provided a 50 μm thick aluminum foil having a maximum surface roughness of 0.8 μm. The aluminum foil was subjected to anodic deposition in an aqueous solution containing 20 wt. % of nickel nitride by applying a DC voltage of 40 V, wherein the formation of nickel oxide and aluminum oxide was caused on the surface of the aluminum foil. Then, the resultant was immersed in an aqueous solution containing 5 wt. % of potassium hydroxide, wherein the surface thereof was etched. The product thus etched was washed with pure water, followed by drying, then the water remained therein was removed by way of water substitution using a mixture of acetone and isopropyl alcohol, followed by subjecting to drying under reduced pressure. Thus, there was obtained an anode.

Separately, the above procedures for forming an anode were repeated to obtain an anode. As well as in Example 1, in accordance with the conventional copper decoration process, copper was deposited on the anode. The anode deposited with the copper on the surface thereof was set to the scanning micro Auger measuring device, wherein the distribution state of the copper deposited on the surface of the anode was examined based on a SEM image.

The examined results revealed that in the anode of the above rechargeable lithium battery, a film having a low electrical conductivity is deposited convergently at each of the protrusions present at the surface of the electrically conductive member comprised of the aluminum foil and there are present a number of openings (or pores) between the protrusions which are covered by said film, wherein said openings are communicated with the electrically conductive member comprised of the aluminum foil.

EXAMPLE 6

There was prepared a rechargeable lithium battery in the same manner as in Example 1, except that the anode was formed in the following manner.

That is, there was firstly provided a 50 μm thick aluminum foil having a maximum surface roughness of 0.8 μm. The aluminum foil was then immersed in an aqueous solution containing 5 wt. % of potassium hydroxide, wherein the surface thereof was etched. The aluminum foil thus etched was washed with pure water, followed by drying, then the water remained therein was removed by way of water substitution using a mixture of acetone and isopropyl alcohol, followed by subjecting to drying under reduced pressure. The aluminum foil thus treated was immersed in a solution obtained by dissolving 0.1M (mol/l) of dibenzo-18-crown-6 as a monomer and 0.2M of tetrafluoroborictetrabutyl ammonium in acetnitrile, wherein electropolymerization was conducted by using a platinum electrode as a counter electrode, and applying a pulse voltage of 3 V, to thereby form a coating film comprised of a large ring polymer on the surface of the aluminum foil. The resultant was washed with acetnitrile, followed by drying under reduced pressure. Thus, there was obtained an anode.

Separately, the above procedures for forming an anode were repeated to obtain an anode. As well as in Example 1, in accordance with the conventional copper decoration process, copper was deposited on the anode. The anode deposited with the copper on the surface thereof was set to the scanning micro Auger measuring device, wherein the distribution state of the copper deposited on the surface of the anode was examined based on a SEM image.

The examined results revealed that in the anode of the above rechargeable lithium battery, a film (that is, the foregoing coating film) having a low electrical conductivity is deposited convergently at each of the protrusions present at the surface of the electrically conductive member comprised of the aluminum foil and there are present a number of openings (or pores) between the protrusions which are covered by said film, wherein said openings are communicated with the electrically conductive member comprised of the aluminum foil.

EXAMPLE 7

There was prepared a rechargeable lithium battery in the same manner as in Example 1, except that the anode was formed in the following manner.

That is, there was firstly provided a 50 μm thick aluminum foil having a maximum surface roughness of 0.8 μm. On the surface of the aluminum foil, there was formed a photoresist film by the conventional coating process. The aluminum foil having the photoresist film formed thereon was subjected to exposure development, wherein the surface thereof was patterned such that a number of openings (or pores) of 1.4 μm in diameter were regularly arranged at equal intervals of 2 μm in a honeycomb state. The resultant was placed in a reactive ion etching apparatus as a plasma treating apparatus, the aluminum foil having the photoresist negative pattern with said openings of 1.4 in diameter thereon was subjected to plasma oxidation treatment using oxygen plasma generated by causing glow discharge in oxygen gas. Thereafter, the photoresist was removed by the conventional manner. The product thus obtained was again placed in the plasma treating apparatus, wherein the remaining portions of the aluminum foil's surface other than the portions (that is, the protrusions present at the aluminum foil's surface) deposited with oxide films by the above plasma oxidation were etched at a depth of 30 um using chlorine plasma generated by causing glow discharge in $CCl_4$ gas.

The resultant was immersed in a solution obtained by mixing a nickel plating solution comprising a boric acid aqueous solution containing nickel sulfate and nickel chloride dissolved therein, perfluoroalkyltrimethyl ammonium, and tetrafluoroethylene as an oligomer, wherein a nickel electrode was used as a counter electrode, and a predetermined DC voltage was applied, whereby nickel plating and water repelling treatment were simultaneously conducted for the surface of the aluminum foil. The resultant thus treated was washed with pure water, followed by drying, then the water remained therein was removed by way of water substitution using a mixture of acetone and isopropyl alcohol, followed by subjecting to drying under reduced pressure. Thus, there was obtained an anode.

Separately, the above procedures for forming an anode were repeated to obtain an anode. As well as in Example 1, in accordance with the conventional copper decoration process, copper was deposited on the anode. The anode deposited with the copper on the surface thereof was set to the scanning micro Auger measuring device, wherein the distribution state of the copper deposited on the surface of the anode was examined based on a SEM image.

The examined results revealed that in the anode of the above rechargeable lithium battery, a film having a low electrical conductivity is deposited convergently at each of the protrusions present at the surface of the electrically conductive member comprised of the aluminum foil and there are present a number of openings (or pores) between the protrusions which are covered by said film, wherein said openings are communicated with the electrically conductive member comprised of the aluminum foil. And it was also found that nickel fine particles and fluororesin are deposited in each opening.

EXAMPLE 8

There was prepared a rechargeable lithium battery in the same manner as in Example 1, except that the anode was formed in the following manner.

That is, there was firstly provided a 50 μm thick aluminum foil having a maximum surface roughness of 0.8 μm. The aluminum foil was subjected to anodic oxidation in an aqueous solution containing 56 wt. % of sulfuric acid by applying a DC voltage of 20 V. The aluminum foil thus treated was washed with pure water, followed by drying, then the water remained therein was removed by way of water substitution using a mixture of acetone and isopropyl alcohol, followed by subjecting to drying under reduced pressure. Thus, there was obtained an anode.

Separately, the above procedures for forming an anode were repeated to obtain an anode. As well as in Example 1, in accordance with the conventional copper decoration process, copper was deposited on the anode. The anode deposited with the copper on the surface thereof was set to the scanning micro Auger measuring device, wherein the distribution state of the copper deposited on the surface of the anode was examined based on a SEM image.

The examined results revealed that in the anode of the above rechargeable lithium battery, a film having a low electrical conductivity is deposited convergently at each of the protrusions present at the surface of the electrically conductive member comprised of the aluminum foil and there are present a number of openings (or pores) between the protrusions which are covered by said film, wherein said openings are communicated with the electrically conductive member comprised of the aluminum foil.

EXAMPLE 9

There was prepared a rechargeable nickel-zinc battery of the configuration shown in FIG. 5 in the following manner.
Formation of Anode There was firstly provided a 50 μm thick titanium foil having a maximum surface roughness of 0.5 μm. The titanium foil was immersed in an aqueous solution of hydrofluoric acid, wherein the surface of the titanium foil was etched. The titanum foil thus treated was subjected to anodic oxidation in an aqueous solution of ammonium borate, wherein an electrode comprised of glassy carbon was used as a counter electrode, and a DC voltage of 20 V was applied. The titanium foil thus treated was washed with pure water, followed by drying. The titanium foil was placed in the reactive ion etching apparatus, wherein the remaining portions of the titanium foil's surface other than the portions (that is, the protrusions present at the titanium foil's surface) deposited with oxide films by the above anodic oxidation were etched at a depth of 30 um using chlorine plasma generated by causing glow discharge in $CCl_4$ gas.

The product thus obtained was subjected to galvanization using an aqueous solution containing zinc and sodium hydroxide as a treating electrolyte solution, wherein a zinc electrode was used as a positive electrode and said titanium foil was used as a negative electrode, and the galvanization was conducted with a current density of 2.5 $A/dm^2$, whereby the titanium foil's surface applied with the anodic oxidation was galvanized. Thus, there was obtained an anode.
Formation of Cathode A mixture obtained by mixing powdery nickel and nickel hydroxide. With the mixture, carboxymethyl cellulose as a binding agent and water were mixed, to thereby obtained a paste-like product. The paste-like product was applied to a nickel foamed member (trademark name: CELLMET, produced by Sumitomo Electric Industries, Ltd.) to make the foamed member charged with the paste-like product. The resultant was dried, followed by subjecting to press working. Thus, there was obtained a cathode.
Electrolyte Solution There was provided an aqueous solution containing 30 wt. % of potassium hydroxide and lithium hydroxide.
Separator There was provided a hydrophilic treated 25 um thick polypropylene member having a number of perforations as a separator.
Fabrication of Rechargeable Nickel-Zinc Battery The fabrication of a rechargeable zinc-nickel battery was conducted in a dry argon atmosphere. The separator was interposed between the cathode and the anode, and the resultant was inserted into a battery case made of titanium clad steel. Then, the electrolyte solution was injected thereinto. The resultant was sealed using an anode cap made of titanium clad steel and an insulating packing made of fluoro rubber. Thus, there was obtained a rechargeable nickel-zinc battery.

Separately, the above procedures for forming an anode were repeated to obtain an anode. As for the anode, examination was conducted using the scanning micro Auger measuring device in the manner as in Example 1.

The examined results revealed that in the anode of the above rechargeable nickel-zinc battery, a film having a low electrical conductivity is deposited convergently at each of the protrusions present at the surface of the electrically conductive member comprised of the titanium foil and there are present a number of openings (or pores) between the protrusions which are covered by said film, wherein said openings are communicated with the electrically conductive member comprised of the titanium foil. And it was also found that zinc fine particles are deposited in each recess present between each adjacent protrusions.

EXAMPLE 10

There was prepared a rechargeable zinc-oxygen battery in the following manner.
Formation of Anode The procedures for forming an anode in Example 99 were repeated to obtain an anode.
Formation of Cathode A mixture of acetylene black, manganese dioxide and cobalt dioxide was well mixed with powdery polytetrafluoroethylene. The resultant mixture was well mixed with a solution obtained by dissolving a powdery fluororesin paint SUPERKONACK (trademark name, produced by Nippon Oils & Fats Co., Ltd.) in an amount of 5 wt. % in xylene to obtain a paste-like product. The paste-like product was applied onto the surface of a nickel-plated copper mesh member, followed by drying, then subjecting to heat treatment at 170° C. under reduced pressure to harden the coating formed on the surface of the nickel-plated copper mesh member. The resultant was subjected to hot pressing treatment using a hot pressure roller to obtain a cathode.

Electrolyte Solution

There was provided a 30 wt. % lithium hydroxide aqueous solution as an electrolyte solution.

Separator

There was provided a conventional cellophane separator for a rechargeable battery.

Fabrication of Rechargeable Zinc-Oxygen Battery

The separator was interposed between the anode and the cathode, and the resultant was inserted into a cathode case made of titanium clad steel having air access holes. Then, the electrolyte solution was injected into thereinto. The resultant was sealed using an anode cap made of titanium clad steel and an insulating packing made of fluoro rubber. Thus, there was obtained a rechargeable zinc-oxygen battery.

COMPARATIVE EXAMPLE 1

The procedures of Example 1 were repeated, except that as the anode, an aluminum foil having a maximum surface roughness of 0.8 μm was used, to thereby obtain a rechargeable lithium battery.

As for the anode, examination was conducted in the same evaluation manner as in Example 1. The examined results revealed that copper was deposited on the entire surface of the anode and particularly, it was deposited at each of the protrusions present at the surface thereof at an increased thickness.

COMPARATIVE EXAMPLE 2

The procedures of Example 1 were repeated, except that as the anode, an aluminum foil having an etched surface (produced by Nihon Chikudenchi Kogyo Kabushiki Kaisha) was used, to thereby obtain a rechargeable lithium battery.

As for the anode, examination was conducted in the same evaluation manner as in Example 1. The examined results revealed that copper was deposited on the entire surface of the anode and particularly, it was deposited at each of the protrusions present at the surface thereof at an increased thickness.

COMPARATIVE EXAMPLE 3

The procedures of Example 2 were repeated, except that as for the calcined member in the formation of the anode, no anodic oxidation was conducted, to thereby obtain a rechargeable lithium battery.

COMPARATIVE EXAMPLE 4

The procedures of Example 3 were repeated, except that as for the calcined member in the formation of the anode, no anodic oxidation was conducted, to thereby obtain a rechargeable lithium battery.

COMPARATIVE EXAMPLE 5

There was prepared a rechargeable lithium battery by repeating the procedures of Example 1, except that the formation of the anode was conducted in the following manner.

That is, powdery natural graphite was subjected to heat treatment in an atmosphere composed of argon gas at 2000° C. The powdery graphite thus treated was mixed with 3 wt. % of acetylene black and 5 wt. % of powdery polyvinylidene fluoride to obtain a mixture. The mixture obtained was mixed with N-methyl-2-pyrrolidone to obtain a paste-like product. The paste-like product was applied onto the surface of a 35 μm thick copper foil in an amount to provide a thickness of 75 μm when dried, followed by drying at 150° C. under reduced pressure. Thus, there was obtained an anode.

COMPARATIVE EXAMPLE 6

The procedures of Example 4 were repeated, except that in the formation of the anode, a well cleaned titanium foil having a maximum surface roughness of 0.5 μm, and no anodic oxidation was conducted therefor, to thereby obtain a rechargeable lithium battery.

COMPARATIVE EXAMPLE 7

The procedures of Example 9 were repeated, except that in the formation of the anode, a well cleaned titanium foil having a maximum surface roughness of 0.5 μm, and no anodic oxidation was conducted therefor, to thereby obtain a rechargeable nickel-zinc battery.

COMPARATIVE EXAMPLE 8

The procedures of Example 10 were repeated, except that the anode was replaced by a zinc electrode member obtained by mixing powdery polytetrafluoroethylene, zinc oxide, and metallic zinc to obtain a mixture, applying the mixture onto the surface of a copper mesh member and subjecting to hot press treatment, to thereby obtain a rechargeable zinc-oxygen battery.

EVALUATION

As for each of the rechargeable batteries obtained in the above Examples 1 to 10 and the above Comparative Examples 1 to 8, evaluation was conducted with respect to battery characteristics through the charging and discharging cycle test.

The charging and discharging cycle test was conducted in the following manner. That is, each rechargeable battery was placed in a charging and discharging device HJ-106M (produced by Hokuto Denko Kabushiki Kaisha), wherein charging and discharging were alternately repeated under conditions of 0.5 C (electric current of 0.5 time the electric capacity per an hour based on the electric capacity calculated from the cathode active material of each rechargeable battery) for the charging and discharging, and 30 minutes for the rest. As for other conditions, in the case of the rechargeable lithium battery, the cut-off voltage upon the charging was made to be 4.5 V and the cut-off voltage upon the discharging was made to be 2.5 V. Similarly, in the case of each of the rechargeable nickel-zinc battery and the rechargeable zinc-oxygen battery, the cut-off voltage upon the charging was made to be 2.0 V and the cut-off voltage upon the discharging was made to be 0.9 V.

The charging and discharging cycle test was initiated by operating charging.

In the charging and discharging test, as for each rechargeable battery, there were observed its battery capacity (that is, an energy density, namely, a discharge energy density) per a unit volume of the rechargeable battery and its charging and discharging cycle life. The battery capacity was based on the service capacity after the third repetition of the charging and discharging cycle. And the charging and discharging cycle life was based on the number of the charging and discharging cycle having been repeated until the battery capacity became less than 60% of the initial battery capacity.

The observed results obtained are collectively shown in Table 1 in terms of the ratio of the charging and discharging cycle lives of the corresponding two rechargeable batteries.

In Table 2, the observed results with respect to energy density are collectively shown in terms of the ratio of the energy densities of one of the rechargeable batteries obtained in Examples 1 to 8 and the rechargeable battery obtained in Comparative Example 5.

Based on the results shown in Table 1, there were obtained the following facts. That is, the rechargeable batteries obtained in Examples 1 to 10 belonging to the present invention are surpassing the rechargeable batteries obtained in Comparative Examples 1 to 4, and 6 to 8 (each not having any insulating or semiconductor film at the protrusion present at the surface of the electrically conductive material) in terms of the charging and discharging cycle life.

Further, based on the results shown in Table 2, there were obtained the following facts. That is, although the rechargeable lithium battery obtained in Example 1 is inferior to the rechargeable lithium battery (having the carbon anode) obtained in Comparative Example 5 by about 10% in terms of the charging and discharging cycle life (see, Table 1), the former is surpassing the latter by about 30% in terms of the energy density. And as for the remaining rechargeable lithium batteries each having the foregoing specific anode, tively shown in Table 3. From the results shown in Table 3, it is understood that any of the rechargeable batteries (each having the foregoing specific anode in which a insulating or semiconductor film is formed at each protrusion present at the electrically conductive material) belonging to the present invention is surpassing the corresponding comparative rechargeable battery in terms of the energy density.

TABLE 1

| | |
|---|---|
| cycle life of Example 1/cycle life of Comparative Example 1 | 4.2 |
| cycle life of Example 1/cycle life of Comaprative Example 2 | 2.8 |
| cycle life of Example 1/cycle life of Comparative Example 5 | 0.9 |
| cycle life of Example 2/cycle life of Comparative Example 3 | 1.8 |
| cycle life of Example 3/cycle life of Comparative Example 4 | 1.9 |
| cycle life of Example 4/cycle life of Comparative Example 6 | 3.4 |
| cycle life of Example 5/cycle life of Comparative Example 1 | 2.9 |
| cycle life of Example 6/cycle life of Comparative Example 1 | 2.4 |
| cycle life of Example 7/cycle life of Comparative Example 1 | 4.0 |
| cycle life of Example 8/cycle life of Comparative Example 1 | 3.3 |
| cycle life of Example 9/cycle life of Comaprative Example 7 | 2.2 |
| cycle life of Example 10/cycle life of Comparative Example 8 | 3.6 |

TABLE 2

| | |
|---|---|
| energy density of Example 1/energy density of Comparative Example 5 | 1.3 |
| energy density of Example 2/energy density of Comparative Example 5 | 1.4 |
| energy density of Example 3/energy density of Comparative Example 5 | 1.3 |
| energy density of Example 4/energy density of Comparative Example 5 | 1.6 |
| energy density of Example 5/energy density of Comparative Example 5 | 1.3 |
| energy density of Example 6/energy density of Comparative Example 5 | 1.2 |
| energy density of Example 7/energy density of Comparative Example 5 | 1.4 |
| energy density of Example 8/energy density of Comparative Example 5 | 1.3 |

TABLE 3

| | |
|---|---|
| energy density of Example 1/energy density of Comparative Example 1 | 1.3 |
| energy density of Example 2/energy density of Comparative Example 3 | 2.0 |
| energy density of Example 3/energy density of Comparative Example 4 | 1.7 |
| energy density of Example 4/energy density of Comparative Example 6 | 3.3 |
| energy density of Example 9/energy density of Comparative Example 7 | 1.1 |
| energy density of Example 10/energy density of Comparative Example 8 | 1.1 | belonging to the present invention, all of them are also surpassing the rechargeable lithium battery obtained in Comparative Example 5 by about 20% to 60% in terms of the energy density. Therefore, the present invention makes it possible to effectively produce a high quality rechargeable battery which provides an increased energy density and has a prolonged charging and discharging cycle life.

In addition, comparison was conducted between the rechargeable battery obtained in Example 1 and the rechargeable battery obtained in Comparative Example 1, between the rechargeable battery obtained in Example 2 and the rechargeable battery obtained in Comparative Example 3, between the rechargeable battery obtained in Example 3 and the rechargeable battery obtained in Comparative Example 4, between the rechargeable battery obtained in Example 4 and the rechargeable battery obtained in Comparative Example 6, between the rechargeable battery obtained in Example 9 and the rechargeable battery obtained in Comparative Example 7, and between the rechargeable battery obtained in Example 10 and the rechargeable battery obtained in Comparative Example 8, in terms of the ratio of the two energy densities. The results obtained are collec-

What is claimed is:

1. A rechargeable battery comprising an anode, a cathode, a separator positioned between said anode and said cathode, and an electrolyte or an electrolyte solution disposed so as to contact with said anode and said cathode, characterized in that said anode comprises an electrically conductive material and has protrusions in said electroconductive material, said electrically conductive material being provided with an insulating or semiconductor film wherein said protrusions are covered by said insulating or semiconductor film so that at least exposed portions of said protrusions to which an electric field is locally centralized are covered by said film, and an opening formed between adjacent protrusions such that said opening is communicated with said electrically conductive material of said anode and said electrically conductive material of said anode contacts with said electrolyte or said electrolyte solution through said opening.

2. A rechargeable battery according to claim 1, wherein each opening has a cross-sectional structure perpendicular to the surface of the anode in that said opening is shaped in a groove-like form wherein at least an outermost surface portion of the electrically conductive material constituting the circumferential wall of said groove-like shaped opening at which an electric field is centralized is covered by the insulating or semiconductor film and the remaining portion of said circumferential wall of said groove-like shaped opening is to be contacted with the electrolyte.

3. A rechargeable battery according to claim 1, wherein the anode is provided with the openings in great numbers such that the anode has a great exposed electrically conductive surface area serving for contact with the electrolyte.

4. A rechargeable battery according to claim 1, wherein the total capacity of the openings formed by the electrically conductive material and the insulating or semiconductor film is greater than the total volume of battery active materials deposited upon operating charging.

5. A rechargeable battery according to claim 1, wherein the insulating or semiconductor film is a metal oxide film formed by way of anodic oxidation.

6. A rechargeable battery according to claim 1, wherein the insulating or semiconductor film is a metal oxide film formed by way of anodic deposition or cathodic deposition.

7. A rechargeable battery according to claim 1, wherein the insulating or semiconductor film is a film selected from the group consisting of films formed from a monomer or oligomer by way of electro-polymerization, polymer films formed by way of electrophoretic electrodeposition, and oxide films formed by way of electrophoretic electrodeposition.

8. A rechargeable battery according to claim 1, wherein the electrically conductive material of the anode comprises one or more elements selected from the group consisting of Al, Ti, Mg, W, Mo, Pb, Si, Ge, Zr, Tl, Nb, Hf, Sb, Cu, Ni, Fe, Pt, Au, and Cr.

9. A rechargeable battery according to claim 1, wherein an anode active material engaged in charging and discharging reactions is lithium and the anode contains lithium element upon operating charging.

10. A rechargeable battery according to claim 1, wherein the cathode comprises a cathode active material containing lithium element.

11. A rechargeable battery according to claim 1, wherein an anode active material engaged in charging and discharging reactions is zinc and the anode contains zinc element upon operating charging.

12. A process for producing a rechargeable battery comprising: (a) an anode, a cathode, a separator positioned between said anode and said cathode, and an electrolyte or an electrolyte solution disposed so as to contact with said anode and said cathode, said process is characterized by including a step of forming an insulating or semiconductor film on an electrically conductive material having protrusions in said electroconductive material constituting said anode by an electrochemical process selected from the group consisting of at least one of anodic oxidation, anodic deposition, cathodic deposition, electro-polymerization, and electrophoretic electrodeposition in a treating electrolyte solution wherein said protrusions present at said electrically conductive material are covered by said insulating or semiconductor film so that at least exposed portions of said protrusions to which an electric field is locally centralized are covered by said film, and (b) simultaneously forming an opening between adjacent protrusions such that said opening is communicated with said electrically conductive material of said anode and said electrically conductive material of said anode contacts said electrolyte or said electrolyte solution through said opening.

13. The process according to claim 12 which further includes a step of conducting etching treatment after the formation of the insulating or semiconductor film protrusions present at the electrically conductive material of the anode.

14. The process according to claim 12 which further includes a step of etching the surface of the electrically conductive material constituting the anode before prior to conducting the step of forming the insulating or semiconductor film protrusions present at the electrically conductive material.

15. The process according to claim 14 which further includes a step of conducting etching treatment after the step of forming the insulating or semiconductor film protrusions present at the electrically conductive material of the anode.

16. The process according to claim 12, wherein the treating electrolyte solution used in the electrochemical process contains a component capable of dissolving the electrically conductive material constituting the anode.

17. The process according to claim 13, wherein the etching treatment comprises one or more etching manners selected from the group consisting of chemical etching, electrochemical etching, and plasma etching.

18. The process according to claim 12, wherein the electrochemical process is conducted by applying at least a electric field selected from the group consisting of DC electric field, AC electric field, and pulse electric field between the electrically conductive material constituting the anode and a counter electrode in the treating electrolyte solution.

19. The process according to claim 12, wherein the treating electrolyte solution is an aqueous solution.

20. The process according to claim 12, wherein after practicing the electrochemical process, a step of immersing at least the electrically conductive material in an organic solvent having a boiling point of 200° C. or less and capable of forming an azeotropic mixture with water and conducting drying under reduced pressure.

21. The process according to claim 12 which further includes a step of conducting water repelling treatment after the step of forming the insulating or semiconductor film protrusions present at the electrically conductive material of the anode.

22. The process according to claim 17, wherein the electrochemical etching is conducted by applying at least a electric field selected from the group consisting of DC electric field, AC electric field, and pulse electric field between the electrically conductive material constituting the anode and a counter electrode in a desired treating electrolyte solution.

23. The process according to claim 22, wherein the treating electrolyte solution is an aqueous solution.

24. The process according to claim 13, wherein after practicing the etching treatment, a step of immersing at least the electrically conductive material in an organic solvent having a boiling point of 200° C. or less and capable of forming an azeotropic mixture with water and conducting drying under reduced pressure.

* * * * *

UNITED STATES PATENT AND TRADEMARK OFFICE
CERTIFICATE OF CORRECTION

PATENT NO. : 5,641,591

DATED : June 24, 1997

INVENTOR(S): SOICHIRO KAWAKAMI ET AL.

It is certified that error appears in the above-identified patent and that said Letters Patent is hereby corrected as shown below:

COLUMN 2

Line 1, "is considered could" should read --may--.
    Line 21, "realized" should read --been realized--.
    Line 23, "developed" should read --been developed--.
    Line 34, "or/and" should read --and/or--.

COLUMN 3

Line 60, "structured" should read --structure--.

COLUMN 5

Line 30, "though" should read --through--.
    Line 49, "be from" should read --be free from--.

COLUMN 6

Line 2, "figs." should read --fig.---.
    Line 5, "due" should read --occurring due--.
    Line 24, "sate" should read --state--.
    Line 46, "recharge" should read --rechargeable--.

COLUMN 7

Line 52, "a" should read --an--.

UNITED STATES PATENT AND TRADEMARK OFFICE
CERTIFICATE OF CORRECTION

PATENT NO. : 5,641,591

DATED : June 24, 1997

INVENTOR(S) : SOICHIRO KAWAKAMI ET AL.

It is certified that error appears in the above-identified patent and that said Letters Patent is hereby corrected as shown below:

COLUMN 9

```
Line 6,  "or/and" should read --and/or--.
Line 21, "a" should read --an--.
Line 22, "a" should read --an--.
Line 46, "becomes to" should read --comes in--.
Line 63, "advantageous" should read --advantages--.
```

COLUMN 10

```
Line 54, "refereed" should read --referred--.
```

COLUMN 11

```
Line 14, "not" should be deleted.
Line 49, "a" should read --an--.
```

COLUMN 12

```
Line 18, "becomes" should read --comes--.
```

COLUMN 13

```
Line 8, "becomes to have" should read --has--.
```

COLUMN 14

```
Line 2,  "whereby" should read --thereby--.
Line 55, "power-like" should read --powder-like--.
```

UNITED STATES PATENT AND TRADEMARK OFFICE
CERTIFICATE OF CORRECTION

PATENT NO. : 5,641,591

DATED : June 24, 1997

INVENTOR(S): SOICHIRO KAWAKAMI ET AL.          Page 3 of 5

It is certified that error appears in the above-identified patent and that said Letters Patent is hereby corrected as shown below:

COLUMN 15

Line 8, "onto to" should read --onto--.
    Line 12, "formed" should read --form--.

COLUMN 17

Line 9, "solution acids" should read --acid solutions--.
    Line 27, "whereby" should read --thereby--.
    Line 44, "insulting" should read --insulating--.

COLUMN 19

Line 25, "canthode" should read --cathode--.
    Line 34, "memberane" should read --membrane--.
    Line 41, "prevent" should read --prevents--.
    Line 53, "having" should read --having been--.
    Line 55, "an" (second occurrence) should read --a--.

COLUMN 22

Line 63, "deposit" should read --deposits--.

COLUMN 23

Line 14, "that that" should read --that--.
    Line 26, "The anode was formed in the following manner." should be deleted.

UNITED STATES PATENT AND TRADEMARK OFFICE
CERTIFICATE OF CORRECTION

PATENT NO. : 5,641,591

DATED : June 24, 1997

INVENTOR(S): SOICHIRO KAWAKAMI ET AL.

It is certified that error appears in the above-identified patent and that said Letters Patent is hereby corrected as shown below:

COLUMN 24

Line 1, "The anode was formed in the following manner." should be deleted.
Line 45, "comprised" should read --comprised of--.

COLUMN 27

Line 62, "30 um" should read --30 μm--.

COLUMN 28

Line 8, "obtained" should read --obtain--.
Line 46, "protrusions" should read --protrusion--.

COLUMN 29

Line 11, "into thereinto." should read --thereinto.--.

COLUMN 32

Line 3, "a insulating" should read --an insulating--.

UNITED STATES PATENT AND TRADEMARK OFFICE
CERTIFICATE OF CORRECTION

PATENT NO. : 5,641,591

DATED : June 24, 1997

INVENTOR(S) : SOICHIRO KAWAKAMI ET AL.

Page 5 of 5

It is certified that error appears in the above-identified patent and that said Letters Patent is hereby corrected as shown below:

<u>COLUMN 34</u>

```
Line 27, "a" should read --an--.
Line 47, "a" should read --an--.
```

Signed and Sealed this

Twenty-seventh Day of January, 1998

*Attest:*

BRUCE LEHMAN

*Attesting Officer*    *Commissioner of Patents and Trademarks*